US011096172B2

(12) United States Patent
Bai et al.

(10) Patent No.: US 11,096,172 B2
(45) Date of Patent: Aug. 17, 2021

(54) SPATIAL DIVERSITY FOR DATA TRANSMISSIONS USING MULTIPLE BEAMS

(71) Applicant: QUALCOMM Incorporated, San Diego, CA (US)

(72) Inventors: Tianyang Bai, Bridgewater, NJ (US); Makesh Pravin John Wilson, San Diego, CA (US); Tao Luo, San Diego, CA (US); Kiran Venugopal, Raritan, NJ (US); Xiaoxia Zhang, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/271,498

(22) Filed: Feb. 8, 2019

(65) Prior Publication Data

US 2019/0335441 A1 Oct. 31, 2019

Related U.S. Application Data

(60) Provisional application No. 62/664,054, filed on Apr. 27, 2018.

(51) Int. Cl.
*H04W 72/04* (2009.01)
*H04W 72/08* (2009.01)
(Continued)

(52) U.S. Cl.
CPC ......... *H04W 72/046* (2013.01); *H04L 5/0048* (2013.01); *H04W 72/042* (2013.01);
(Continued)

(58) Field of Classification Search
CPC .................. H04L 5/0048; H04W 72/046; H04W 72/042; H04W 72/085; H04W 88/02; H04W 88/08
See application file for complete search history.

(56) References Cited

U.S. PATENT DOCUMENTS

2008/0225965 A1* 9/2008 Pi .......................... H04L 1/0068
375/260
2008/0310535 A1* 12/2008 Kwon ............... H03M 13/2957
375/260
(Continued)

FOREIGN PATENT DOCUMENTS

WO 2018064327 A1 4/2018

OTHER PUBLICATIONS

3GPP TSG RAN WG1 Meeting #88bis R1-1705179; "Discussion on retransmission scheme of code block groups in NR"; Spokane, USA; Panasonic; Apr. 3-7, 2017 (Year: 2017).*
(Continued)

*Primary Examiner* — Benjamin H Elliott, IV
(74) *Attorney, Agent, or Firm* — Arent Fox LLP

(57) ABSTRACT

An apparatus may determine a beam configuration for a data transmission that includes at least one code block in a first resource block. In certain aspects, the at least one code block may include a first set of bits and a second set of bits. In certain aspects, the beam configuration may include a first beam in a first beam direction that may be used to communicate the first set of bits of the at least one code block in a first set of symbols of the first resource block and a second beam in a second beam direction that is used to communicate the second set of bits of the at least one code block in the second set of symbols of the first resource block. The apparatus may transmit signaling that indicates the beam configuration for the data transmission in the first resource block to a UE.

27 Claims, 15 Drawing Sheets

(51) Int. Cl.
  *H04L 5/00* (2006.01)
  *H04W 88/02* (2009.01)
  *H04W 88/08* (2009.01)
(52) U.S. Cl.
  CPC .......... *H04W 72/085* (2013.01); *H04W 88/02* (2013.01); *H04W 88/08* (2013.01)

(56) References Cited

U.S. PATENT DOCUMENTS

| | | | | |
|---|---|---|---|---|
| 2016/0379489 | A1* | 12/2016 | MacFarlane | G08G 1/0141 701/119 |
| 2019/0222279 | A1* | 7/2019 | Xi | H04W 72/00 |
| 2019/0335441 | A1* | 10/2019 | Bai | H04L 5/0053 |
| 2019/0349915 | A1* | 11/2019 | Ahn | H04L 5/0048 |
| 2019/0379489 | A1 | 12/2019 | Hwang et al. | |
| 2020/0014455 | A1* | 1/2020 | Gao | H04L 5/0048 |
| 2020/0028618 | A1* | 1/2020 | Peng | H04L 27/2691 |

OTHER PUBLICATIONS

3GPP TSG RAN WG1 Meeting #88bis R1-1705401; "Overview of CBG-based retransmission in NR"; Samsung; Spokane, USA, Apr. 3-7, 2017 (Year: 2017).*
3GPP TSG RAN WG1 Meeting #88bis R1-1705653; "Discussion on enhanced HARQ feedback and CBG-based partial retransmission"; Lenovo et al.; Spokane, USA Apr. 3-7, 2017 (Year: 2017).*
3GPP TSG-RAN WG1 Meeting #88bis R1-1706049; "On Protocol Impacts of Code Block Group Based HARQ-ACK Feedback"; Ericsson; Spokane, U.S., Apr. 3-7, 2017 (Year: 2017).*
Interdigital Communications: "Robust and Efficient Beam Management for NR", 3GPP Draft; R1-1610345 Robust and Efficient Beam Management for NR, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016 Oct. 9, 2016, XP051150360, Retrieved from the Internet: URL:http://www.3gpp.org/ftp/Meetings_3GPP_SYNC/RAN1/Docs/ [retrieved on Oct. 9, 2016], 4 pages.
International Search Report and Written Opinion—PCT/US2019/028531—ISA/EPO—dated Jul. 24, 2019.
Qualcomm: "Beam Management for NR", 3GPP Draft; R1-1711160, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051300360, Retrieved from the Internet: URL:http://www.3gpp.org/ftp/Meetings_3GPP_SYNC/RAN1/Docs/ [retrieved on Jun. 26, 2017], 13 pages, Section 2.

* cited by examiner

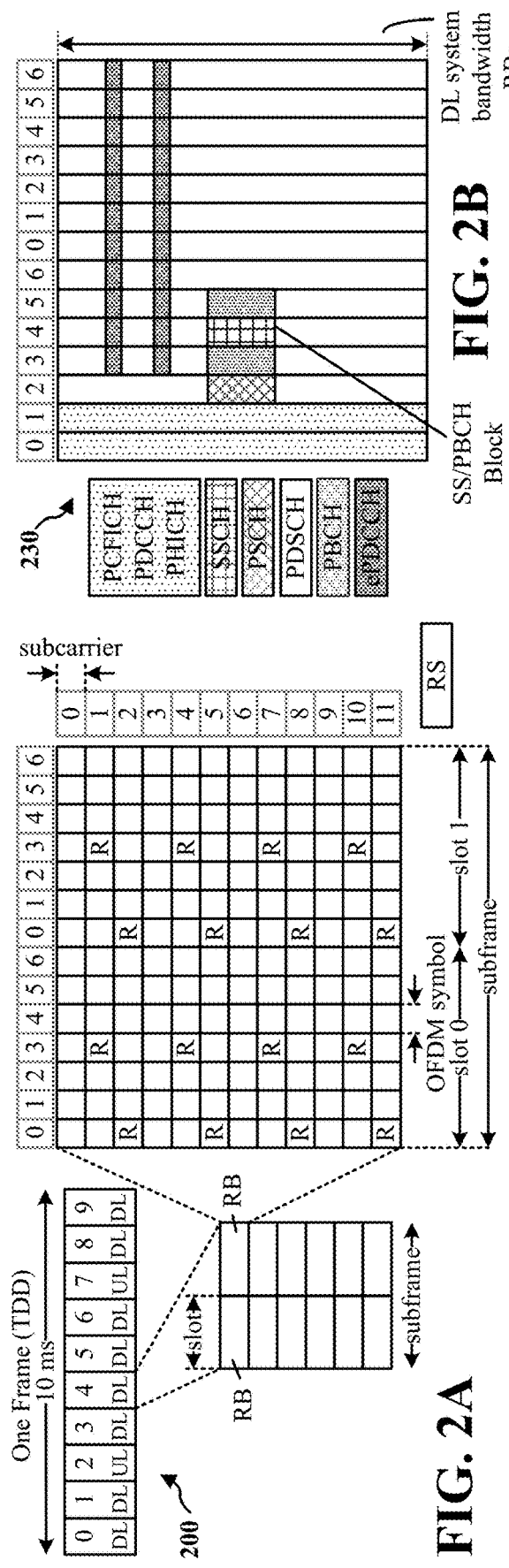
FIG. 2A
FIG. 2B
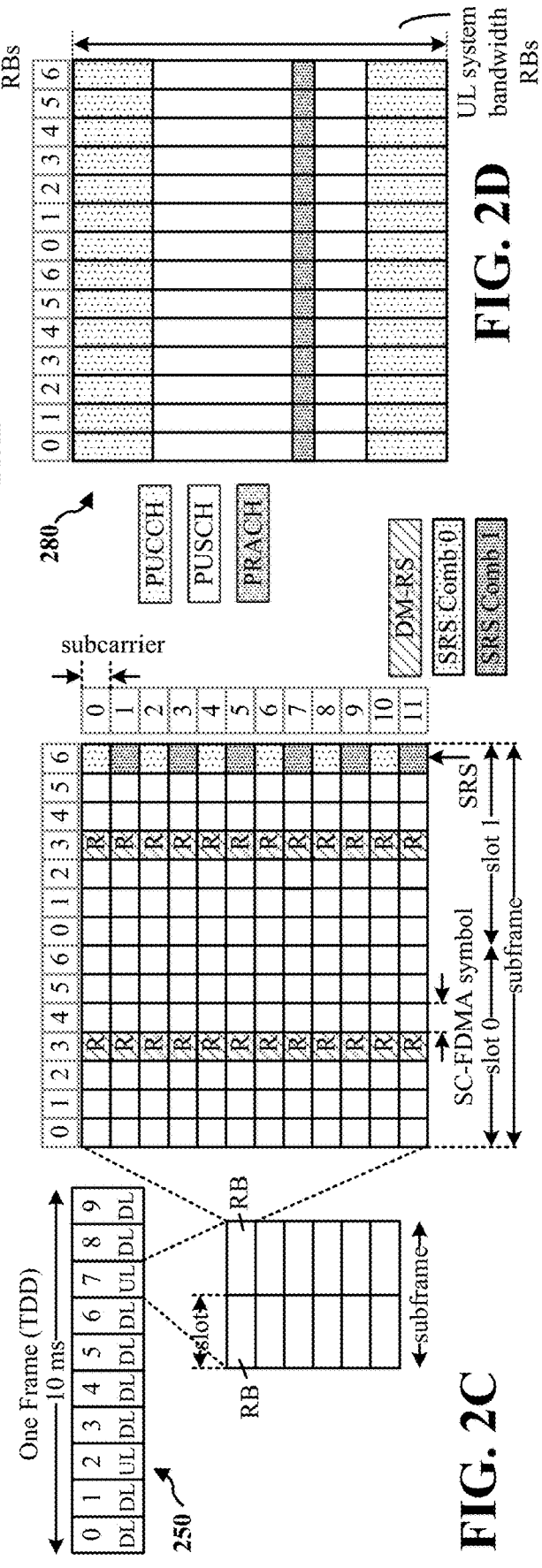
FIG. 2C
FIG. 2D

SPATIAL DIVERSITY FOR DATA TRANSMISSIONS USING MULTIPLE BEAMS

CROSS-REFERENCE TO RELATED APPLICATION(S)

This application claims the benefit of U.S. Provisional Application No. 62/664,054, entitled "SPATIAL DIVERSITY FOR DATA TRANSMISSIONS USING MULTIPLE BEAMS" and filed on Apr. 27, 2018, which is expressly incorporated by reference herein in its entirety.

BACKGROUND

Technical Field

The present disclosure relates generally to communication systems, and more particularly, to a spatial diversity transmission scheme.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A 5G New Radio (NR) communication system, which may include a millimeter wave (mmW) communication system, may use directional beamforming to increase the signal-to-noise (SNR) of signals transmitted between a base station and a user equipment (UE). One potential drawback from using directional beamforming is that a beamformed channel may be sensitive to dynamic blocking—e.g., the SNR between the base station and the UE may decrease and/or a radio link between the base station and the UE may fail.

For example, when a user moves from point A to point B, an object that did not obstruct the beamformed direction at point A may obstruct the beamformed direction between at point B. When the beamformed direction between the base station and the UE is obstructed, the SNR of signal transmissions may be reduced, which may lower the quality of service (QoS) experienced by the user.

Some UEs may be only able to receive from one beam (e.g., beamformed direction) at a time such that the spatial diversity of the system may not be exploited by concurrent transmissions via different beams. The present disclosure provides a solution to the issue of dynamic blocking by enabling the base station and the UE to switch between a first beamformed direction and a second beamformed direction at different intervals (e.g., different symbols of a resource block (RB)) to exploit the spatial diversity of the system.

In a first aspect of the disclosure, a first method, a first computer-readable medium, and a first apparatus are provided. The first apparatus may be a base station. The first apparatus may determine a beam configuration for a data transmission, and the beam configuration may include a first beam associated with a first beam direction and a second beam associated with a second beam direction. The first apparatus may transmit signaling that indicates the beam configuration for the data transmission to a UE. The first apparatus may transmit or receive the data transmission based at least in part on the beam configuration, and the data transmission may include at least one code block in an RB. The at least one code block may include a first set of bits in a first set of symbols of the RB and a second set of bits of the at least one code block in a second set of symbols of the RB.

In certain configurations of the first aspect, the signaling indicates a switch in the RB between the first set of symbols including the first set of bits of the at least one code block and the second set of symbols including the second set of bits of the at least one code block. In certain configurations of the first aspect, the signaling includes one or more of downlink control information (DCI) signaling, medium access control (MAC) control element (CE) (MAC-CE) signaling or radio resource control (RRC) signaling, the RRC signaling indicates a beam table for a plurality of beam switch patterns, and the DCI signaling or MAC-CE signaling down selects one of the plurality of beam switch patterns. In certain configurations of the first aspect, the transmitting or receiving the data transmission includes transmitting or receiving the first set of bits via the first beam in the first beam direction in the first set of symbols of the RB, and transmitting or receiving the second set of bits via the second beam in the second beam direction in the second set of symbols of the RB. In certain configurations of the first aspect, the data transmission includes at least one first reference signal communicated via the first beam in the first set of symbols of the RB, and the data transmission includes at least one second reference signal communicated via the second beam in the second set of symbols of the RB. In certain configurations of the first aspect, the at least one first reference signal includes one or more of a first set of demodulation reference signals (DMRSs) or a first set of phase tracking reference signals (PTRSs), and the at least one second reference signal includes one or more of a second set of DMRSs or a second set of PTRSs. In certain configurations of the first aspect, the first apparatus may further determine a first modulation and coding scheme (MCS) for the first beam based at least in part on a channel measurement and a second MCS for the second beam based at least in part on the channel measurement. In certain configurations of the first aspect, the first apparatus may further perform the channel measurement for each of a plurality of beams, and the beam configuration may be determined based at least in part on the channel measurement for each of the plurality of beams. In certain configurations of the first aspect, the signaling includes an indication of the first MCS for the first beam and the second MCS for the second beam. In certain configurations of the first aspect, the first set of bits and the second set of bits of the at least one code block are encoded with a same channel code. In certain configurations of the first aspect, the at least one code block comprises a code block group.

In a second aspect of the disclosure, a second method, a second computer-readable medium, and a second apparatus are provided. The second apparatus may be a UE. The second apparatus may receive, from a base station, signaling that indicates a beam configuration for a data transmission, and the beam configuration may include a first beam associated with a first beam direction and a second beam associated with a second beam direction. The second apparatus may receive or transmit the data transmission based at least in part on the beam configuration. The data transmission may include at least one code block in an RB, and the at least one code block may include a first set of bits in a first set of symbols of the RB and a second set of bits of the at least one code block in a second set of symbols of the RB.

In certain configurations of the second aspect, the signaling indicates a switch in the RB between the first set of symbols including the first set of bits of the at least one code block and the second set of symbols including the second set of bits of the at least one code block. In certain configurations of the second aspect, the signaling includes one or more of DCI signaling, MAC-CE signaling or radio resource control (RRC) signaling, the RRC signaling indicates a beam table for a plurality of beam switch patterns, and the DCI signaling or MAC-CE signaling down selects one of the plurality of beam switch patterns. In certain configurations of the second aspect, the receiving or transmitting the data transmission includes transmitting or receiving the first set of bits via the first beam in the first beam direction in the first set of symbols of the first RB, and transmitting or receiving the second set of bits via the second beam in the second beam direction in the second set of symbols of the RB. In certain configurations of the second aspect, the data transmission includes at least one first reference signal communicated via the first beam in the first set of symbols of the RB, and the data transmission includes at least one second reference signal communicated via the second beam in the second set of symbols of the RB. In certain configurations of the second aspect, the at least one first reference signal includes one or more of a first set of DMRSs or a first set of PTRSs, and the at least one second reference signal includes one or more of a second set of DMRSs or a second set of PTRSs. In certain configurations of the second aspect, the signaling includes an indication of a first MCS for the first beam and a second MCS for the second beam. In certain configurations of the second aspect, the first set of bits and the second set of bits of the at least one code block are encoded with a same channel code. In certain configurations of the second aspect, the at least one code block comprises a code block group.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

DETAILED DESCRIPTION

Figure 1:
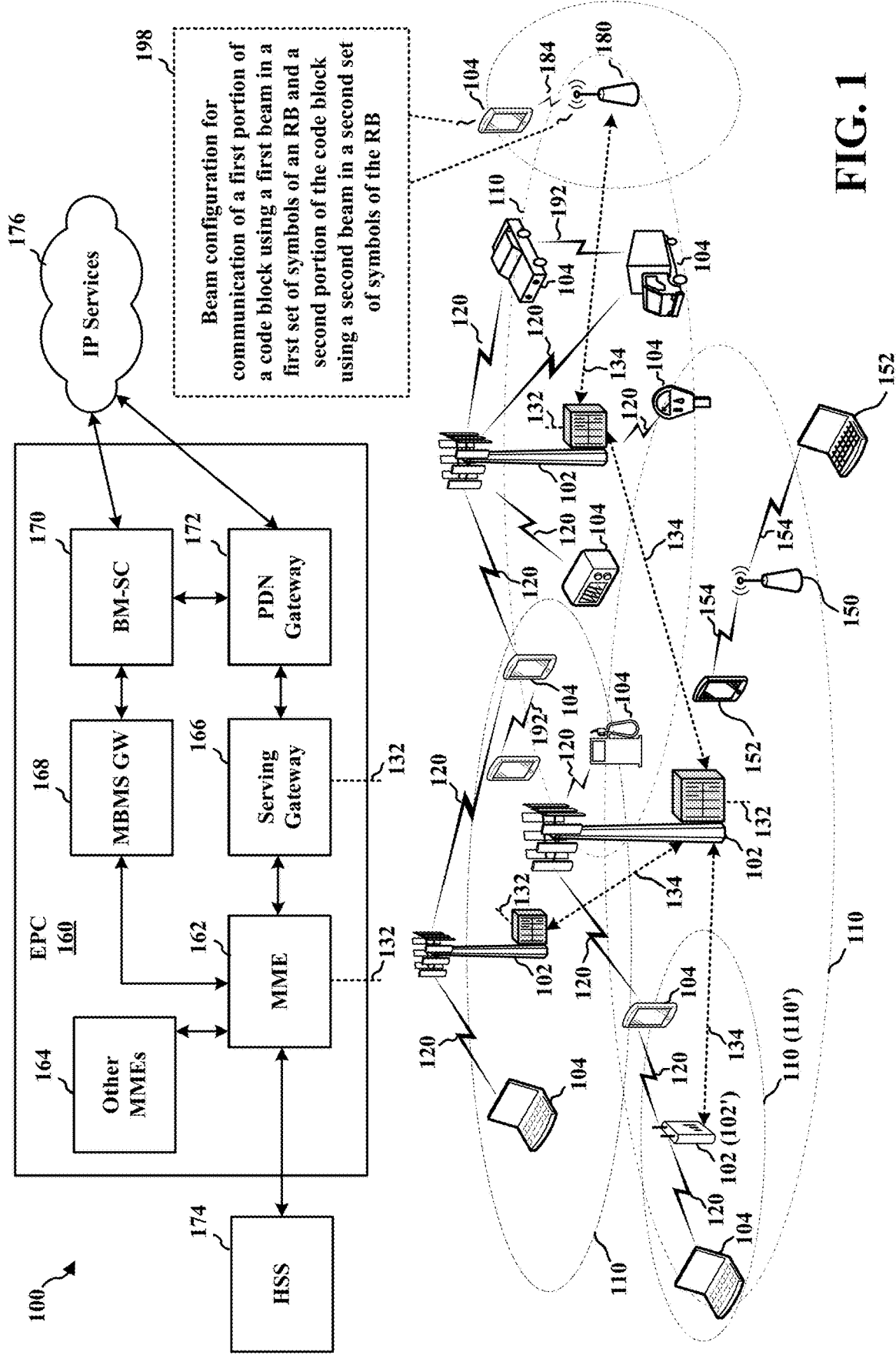
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a base station 102/180 may determine a beam configuration 198 for a data transmission, and the beam configuration 198 may include a first beam associated with a first beam direction and a second beam associated with a second beam direction. The base station 102/180 may transmit signaling that indicates the beam configuration 198 for the data transmission to a UE 104. Correspondingly, the UE 104 may receive, from the base station 102/180, signaling that indicates the beam configuration 198, including the first beam associated with the first beam direction and the second beam associated with the second beam direction.

The base station 102/180 may then transmit or receive the data transmission based at least in part on the beam configuration 198. The data transmission may include at least one code block in an RB, and the at least one code block may include a first set of bits in a first set of symbols of the RB and a second set of bits of the at least one code block in a second set of symbols of the RB. Accordingly, the UE 104 may receive or transmit the data transmission, including the at least one code block in the RB, based at least in part on the beam configuration 198, and the at least one code block may include the first set of bits in the first set of symbols of the RB and the second set of bits of the at least one code block in the second set of symbols of the RB.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe.

The subcarrier spacing and symbol length/duration are a function of the numerology. The subcarrier spacing may be equal to $2^\mu *15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a RB (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
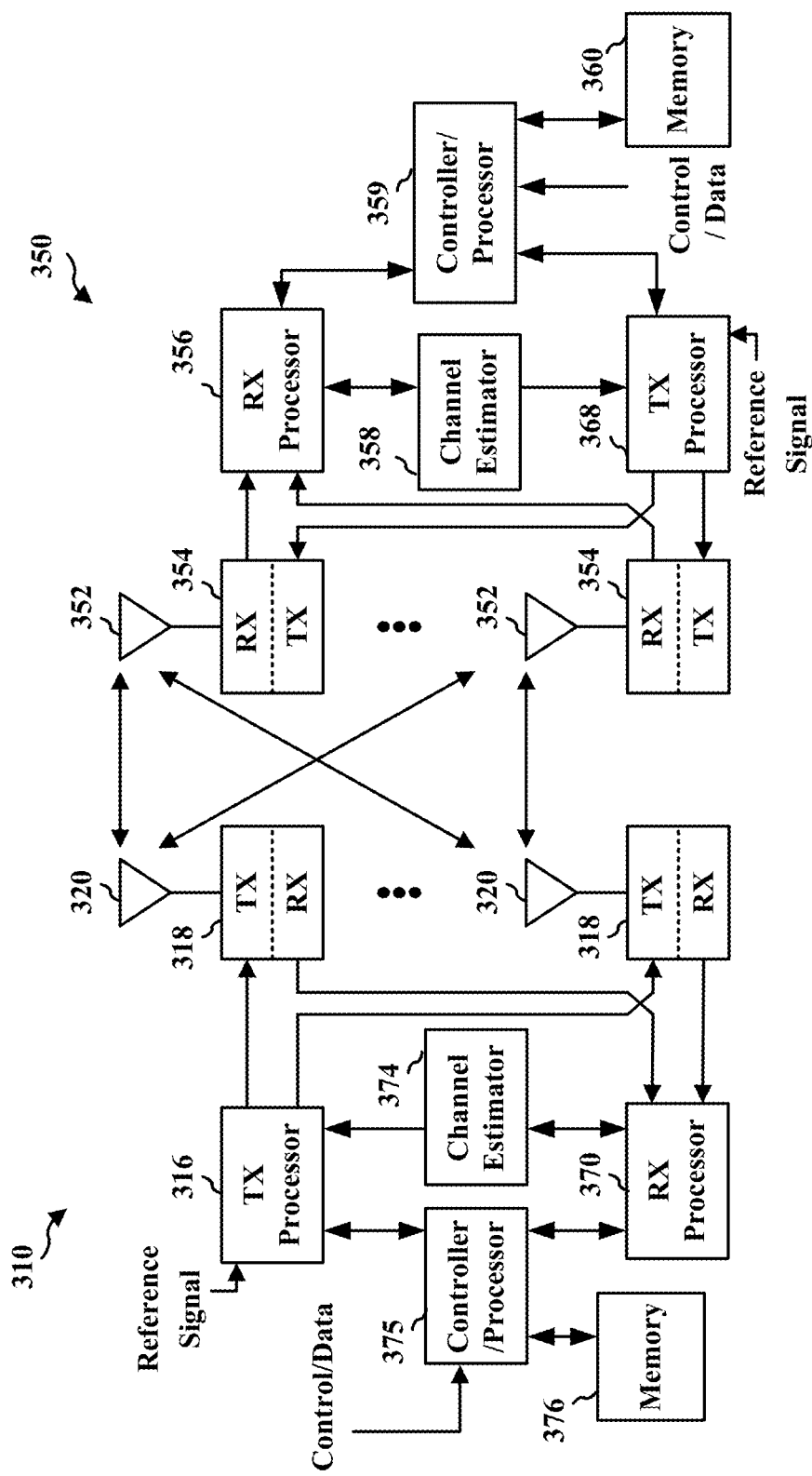
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
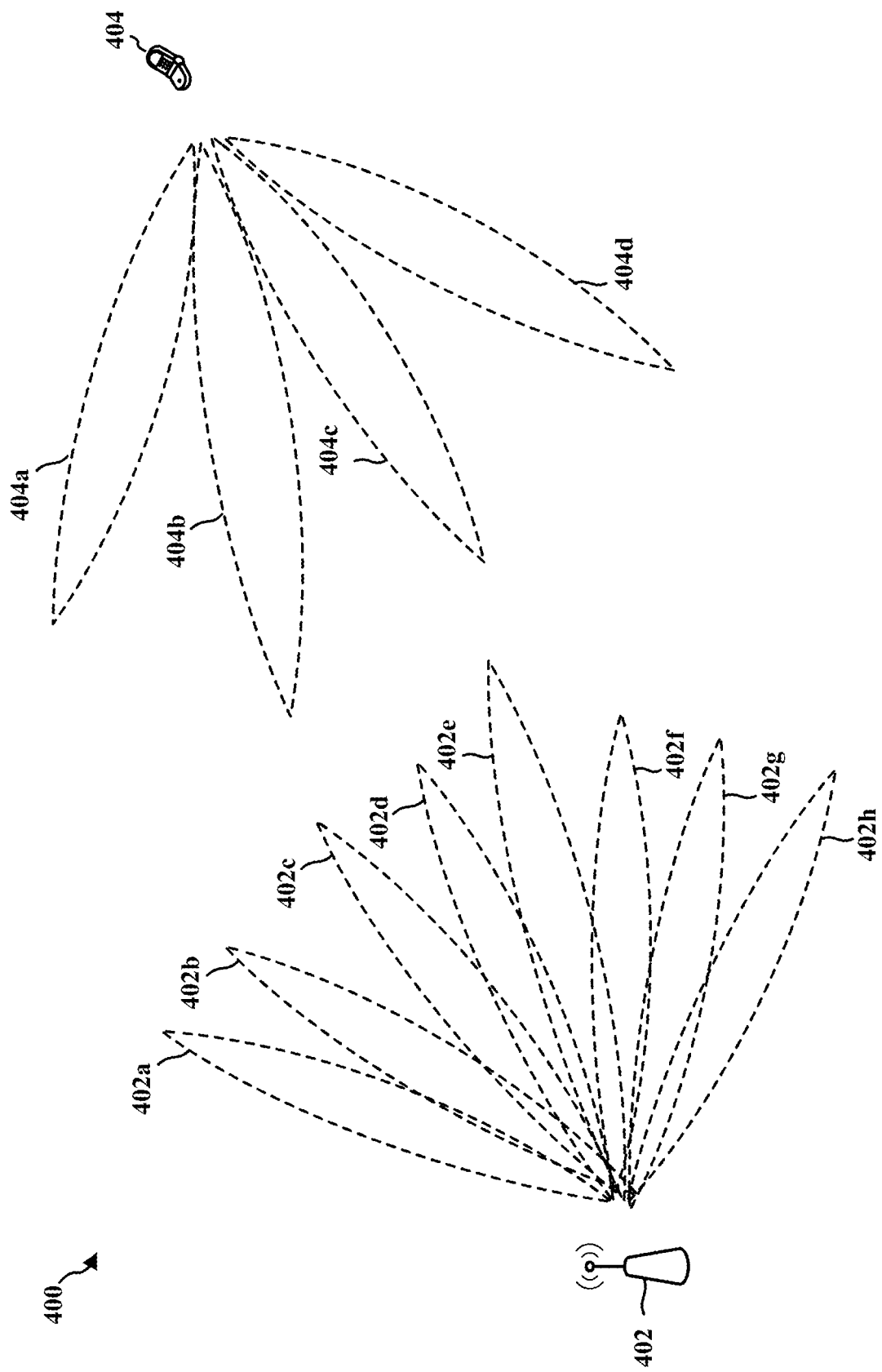
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5B:
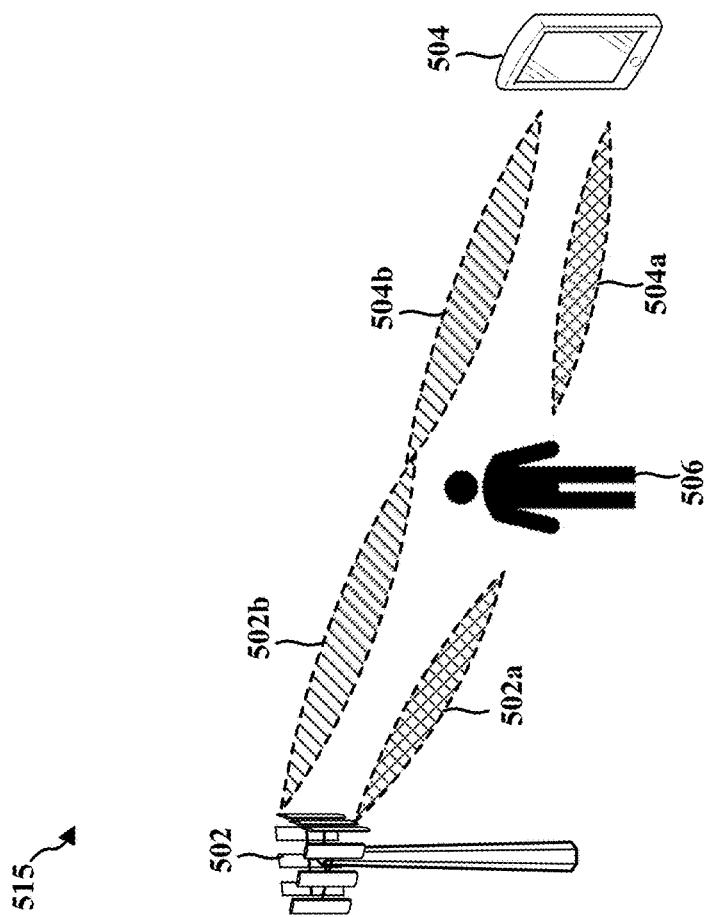
FIG. 5B illustrates a wireless communication system in accordance with certain aspects of the present disclosure.
Figure 5A:
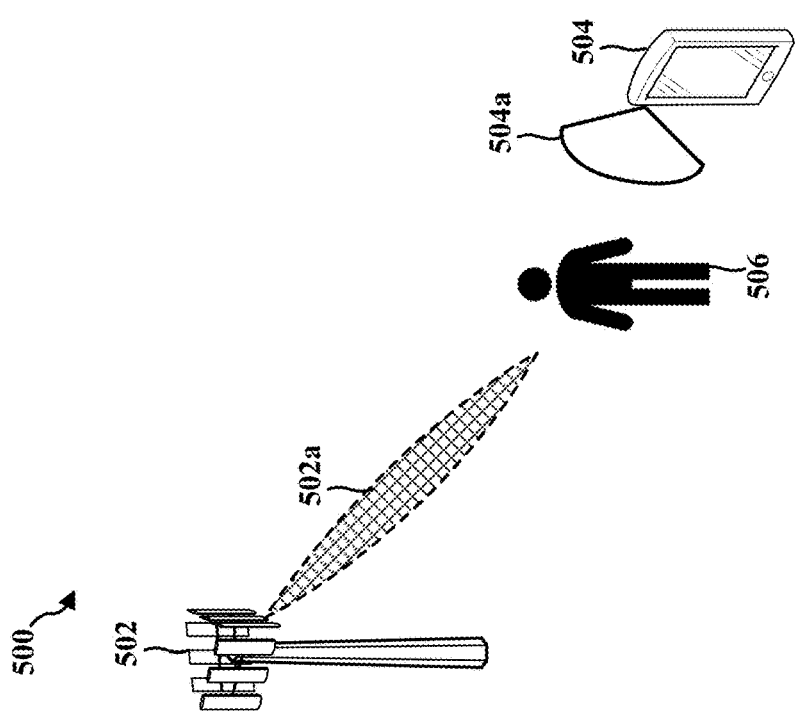
FIG. 5A illustrates a wireless communication system in accordance with certain aspects of the present disclosure.

FIG. 5A illustrates a wireless communication system 500 in accordance with certain aspects of the present disclosure. The wireless communication system 500 may include a base station 502 and a UE 504. The base station may correspond to, e.g., base station 102, 180, 310, 402, 1150, the apparatus 802/802'. The UE may correspond to, e.g., UE 104, 350, 404, 850, the apparatus 1102/1102'.

A 5G NR communication system (e.g., a mmW communication system) may use directional beamforming to increase the SNR of signals transmitted between the base station 502 and the UE 504. One potential drawback from using directional beamforming is that a beamformed channel may be sensitive to dynamic blocking.

For example, when a user 506 moves from point A to point B, an object that did not obstruct the beamformed direction (e.g., direction 502a and direction 504a) at point A may obstruct the beamformed direction between at point B. Further, when the user's 506 fingers block one or more of the subarrays located at the UE 504, the beamformed direction between the base station 502 and the UE 504 may also be obstructed. Additionally, when the user 506 rotates the UE 504, the polarization between base station 502 and the UE 504 may be mismatched. When the beamformed direction between the base station 502 and the UE 504 is obstructed and/or when the polarization is mismatched, the SNR of signal transmissions may be reduced, which may lower the quality of service (QoS) experienced by the user 506.

FIG. 5B illustrates a wireless communication system 515 in accordance with certain aspects of the present disclosure.

The wireless communication system 500 may include a base station 502 and a UE 504. The base station may correspond to, e.g., base station 102, 180, 310, 402, 1150, the apparatus 802/802'. The UE may correspond to, e.g., UE 104, 350, 404, 850, the apparatus 1102/1102'.

As seen in FIG. 5B, the first beamformed direction 502a, 504a is blocked by the user 506, and hence, transmissions sent in the first beamformed direction 502a, 504a may have a reduced SNR as compared to when the first beamformed direction 502a, 504a is unblocked. However, the second beamformed direction 502b, 504b may be unblocked, and hence, may provide an increased SNR as compared to the first beamformed direction 502a, 504a.

Some UEs may be only able to receive from one beam (e.g., beamformed direction) at a time (e.g. some UEs may have a single RF chain and/or scheduling conflicts may other RF chains of some UEs to be unavailable) such that the spatial diversity of the system may not be exploited by concurrent transmissions via the different beams. The present disclosure may provide an approach to address dynamic blocking of a beamformed direction, e.g., by enabling the base station 502 and the UE 504 to transmit or receive a first set of bits of a block using the first beamformed direction 502a, 504a in a first set of symbols of a first RB and a second set of bits of a block using the second beamformed direction 502b, 504b in a second set of symbols of the first RB, e.g., as described below in connection with FIGS. 5C-5D, 6A-6B, and 7-12.

Figure 5C:
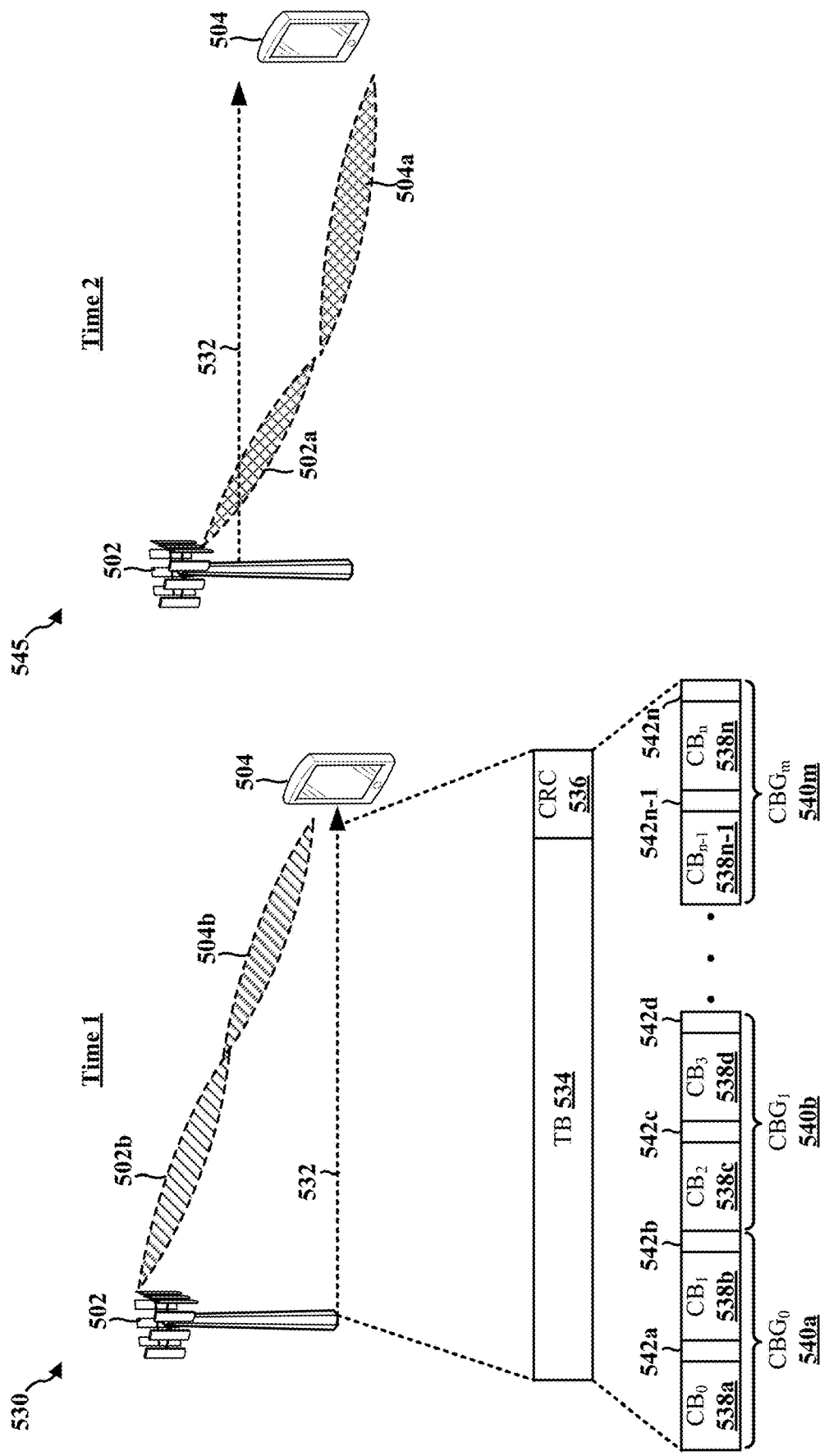
FIG. 5C illustrates a wireless communication system in accordance with certain aspects of the present disclosure.

FIG. 5C illustrates a wireless communication system 530, 545 in accordance with certain aspects of the present disclosure. The wireless communication system 500 may include a base station 502 and a UE 504. The base station may correspond to, e.g., base station 102, 180, 310, 402, 1150, the apparatus 802/802'. The UE may correspond to, e.g., UE 104, 350, 404, 850, the apparatus 1102/1102'.

At time 1 (e.g., a first set of symbols of a first RB), the base station 502 and the UE 504 may communicate with one another using the second beamformed direction 502b, 504b (e.g., a first beam at a first time). At time 2 (e.g., a second set of symbols of a first RB), the base station 502 and the UE 504 may communicate with one another using the first beamformed direction 502a, 504a (e.g., a second beam at a second time). By switching between the beamformed directions, transmissions may be sent and/or received from multiple beams in a time-division multiplexing (TDM) manner.

The base station 502 may transmit or receive a data transmission 532 to or from the UE 504 using the first beamformed direction 502a, 504a and using the second beamformed direction 502b, 504b. The data transmission 532 may include at least one TB 534. The TB 534 may be transmitted in one transmission time interval (TTI) without spatial multiplexing. The TB 534 may be split into a plurality of code blocks (CBs) 538a, 538b, 538c, 538d, 538n-1, 538n, and a subset of the set of CBs may be grouped into CB groups (CBGs) 540a, 540b, 540m. In various aspects, a PDSCH and/or PUSCH transmission may be scheduled based on at least one of CBGs 540a, 540b, 540m. The TB 534 may include a CRC 536 and, when split into the CBs 538a, 538b, 538c, 538d, 538n-1, 538n, each of the CBs 538a, 538b, 538c, 538d, 538n-1, 538n may be associated with a respective CRC 542a, 542b, 542c, 542d, 542n-1, 542n.

Channel coding may be applied to information bits in 5G NR to achieve redundancy in the coded bits for robustness. For example, assume the base station 502 has a data transmission 532 that includes at least one of the CBs 538a, 538b, 538c, 538d, 538n-1, 538n to send to the UE 504. Each of the bits in the at least one CB 538a, 538b, 538c, 538d, 538n-1, 538n may be coded using the same channel code (e.g., Turbo code (TC), tail biting convolutional code (TBCC), low density parity check code (LDPC), ultra-reliable low-latency code (URLLC), polar codes, etc.).

A first set of bits of the TB 534 may be transmitted by the base station 502 using the second beamformed direction 502b, 504b at time 1 (e.g., a first set of symbols of a first RB). For example, the first set of bits may include all or a portion of the bits of one of the CBs 538a, 538b, 538c, 538d, 538n-1, 538n. Similarly, a second set of bits of the TB 534 may be transmitted by the base station 502 using the first beamformed direction 502a, 504a at time 2 (e.g., a second set of symbols of the first RB) (although time 1 and time 2 may be transposed). In some aspects, time 2 may be subsequent to time 1; however, time 1 and time 2 may be interleaved in other aspects (e.g., symbols of time 1 and symbols of time 2 may alternatingly occur).

By transmitting a coded block in this manner, even if one beamformed direction is blocked and the corresponding coded bits are lost, if the redundancy is sufficient in the channel coding, the UE 504 may still decode the full information from the TB 534 when the second set of bits are received via the first beamformed direction 502a, 504a at time 2.

In order to implement the techniques of the present disclosure, the base station 502 may identify the beamformed directions and time intervals that may be used to transmit different sets of bits of the code block. In other words, the base station 502 may identify a beam configuration for a data transmission that includes the at least one code block of coded bits where coded bits from at least one code block are transmitted via different beamformed channels at different time intervals. The beam configuration may be determined based at least in part on channel measurements performed for a plurality of beamforming directions. The beams may be selected for the beam configuration based on an SNR threshold, signal strength threshold, etc.

Upon determining the beam configuration, the base station 502 may send signaling (e.g., DCI signaling, MAC control element (MAC-CE) signaling, or RRC signaling) to the UE 504 to indicate the beamformed directions and the associated time intervals (e.g., the beam switch time) that will be used for communications. In certain configurations, the signaling may include first signaling that identifies a list of candidate beam switch patterns in one transmission, and second signaling that activates one or more patterns from the table for use in communicating with the base station 502. The beam switch pattern may include a sequence of timing and switch directions for the beam switches. For example, in the first signaling a list of two candidate beam switch patterns are indicated: a first beam switch pattern, where the beam switch is performed in every even number indexed symbols by switching from the first beam direction associated with a first transmission configuration indicator (TCI) to a second beam direction associated with a second TCI, and in every odd number indexed symbol by switching from the second beam direction associated with the second TCI to the first beam direction associated with the first TCI; and a second beam switch pattern defines the same beam switching time with an opposite beam switch direction. In the second signaling, either the first or the second candidate beam switch pattern is down-selected.

The UE 504 may use the beam configuration to receive the first set of bits of the TB 534 via the second beamformed direction 502b, 504b at time 1, and the second set of bits of the TB 534 via the first beamformed direction 502a, 504a at time 2. Additionally and/or alternatively, the UE 504 may use the beam configuration to transmit a first set of bits of the TB 534 via the second beamformed direction 502b, 504b at time 1, and the second set of bits of the TB 534 via the first beamformed direction 502a, 504a at time 2.

Reference signals (e.g., DMRS and/or phase tracking reference signals (PTRS)) may be included in each beamformed channel such that channel estimation and/or phase tracking may be performed by the receiving device, e.g., as described below in connection with FIGS. 6A and 6B.

The signaling that indicates the beam configuration may also indicate a modulation and coding scheme (MCS) associated with each of the beamformed directions used for sending the data transmission. For example, the signaling may indicate that MCS 1 is used for the first beamformed direction 502a, 504a and that MCS 3 is used for the second beamformed direction 502b, 504b. The TB size may be determined based at least in part on the MCSs indicated for each beamformed direction by the signaling.

Figure 5D:
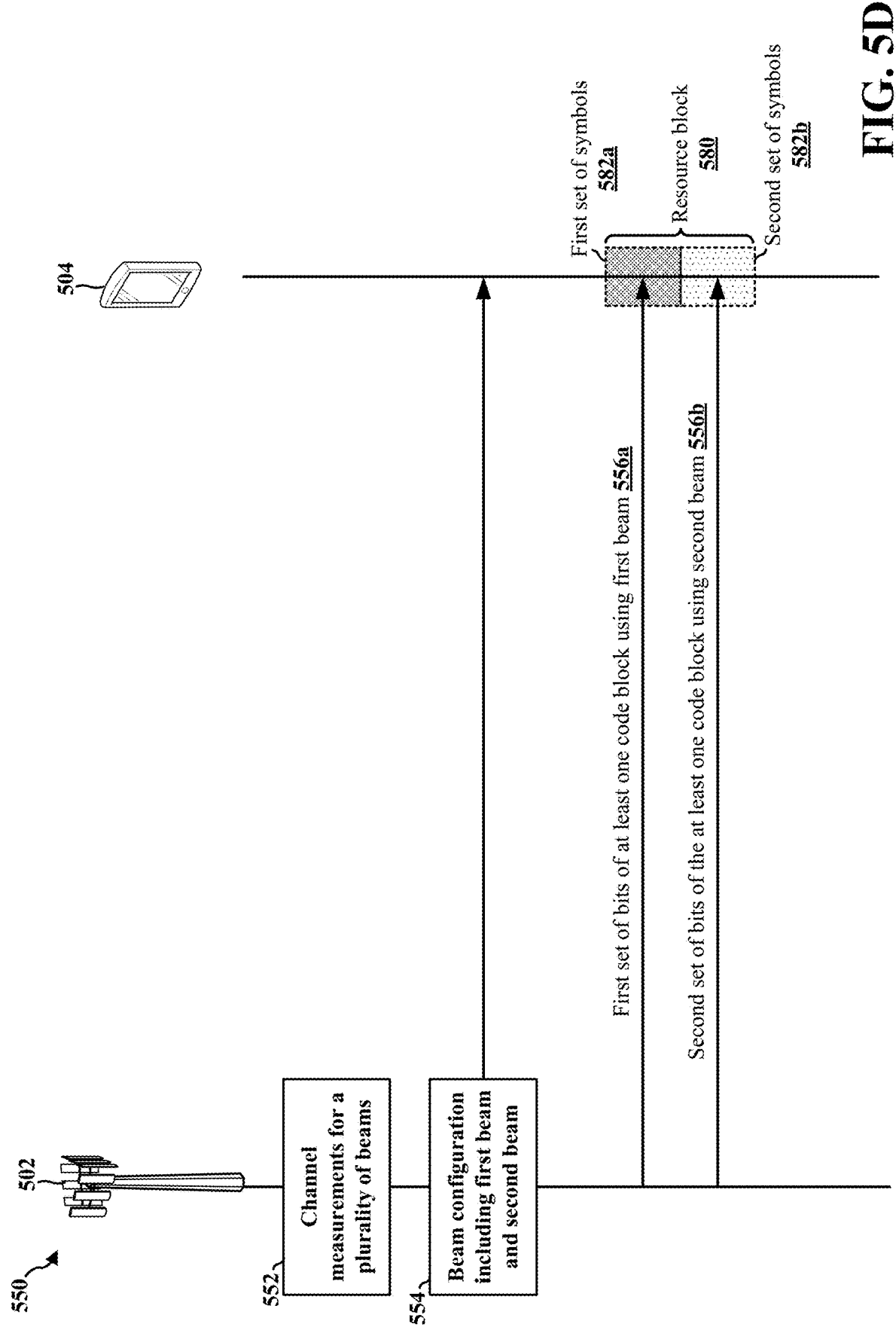
FIG. 5D illustrates a call flow diagram of a method of wireless communication in accordance with certain aspects of the present disclosure.

FIG. 5D illustrates a call flow diagram of a method 550 of wireless communication, in accordance with certain aspects of the present disclosure. The method 550 of wireless communication may be performed by the base station 502 and the UE 504.

Initially, the base station 502 may transmit a plurality of signals on a plurality of beams to the UE 504. For example, the base station 502 may transmit a respective reference signals on each of a set of transmit beams of the base station 502. The UE 504 may receive a respective reference signal on each of a set of receive beams of the UE 504. Similarly, the UE 504 may transmit a respective reference signal on each of a set of transmit beams of the UE 504, and the base station 502 may receive a respective reference signal on each of a set of receive beams of the base station 502. Referring to FIG. 4, for example, the base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In the illustrated aspect, the base station 502 may perform channel measurements 552 for each reference signal transmitted or received on each of the set of receive beams. For example, the base station 502 may measure a value associated with channel quality (e.g., an SNR, a reference signal received power (RSRP), or another channel quality metric) for each reference signal received on each of the set of receive beams of the base station 502. In another example, the base station 502 may receive information from the UE 504 indicating a set of values corresponding to a set transmit beams of the base station 502, such as one or more CQIs. The base station 502 may compare each value to a threshold and/or to one another in order to determine the "best" beams corresponding to the "best" measured values (e.g., highest SNRs).

The base station 502 may select a subset of the set of beams based on the channel measurements 552. For example, the base station 502 may select a subset of beams that meet an SNR threshold, signal strength threshold, etc. For example, referring to FIG. 5C, the base station 502 may select the first beamformed direction 502a, 504a and select the second beamformed direction 502b, 504b based on the channel measurements 552. Further based on the channel measurements 552, the base station 502 may determine a first MCS for the first beamformed direction 502a, 504a and determine a second MCS for the second beamformed direction 502b, 504b. In certain aspects, a TB size (e.g., a size of the TB 534) of a data transmission (e.g., the data transmission 532) to be transmitted or received using the first beamformed direction 502a, 504a and using the second beamformed direction 502b, 504b may be selected based at least in part on the first MCS and the second MCS. For example, referring to FIG. 5C, the base station 502 may determine that MCS 1 may be used for the first beamformed direction 502a, 504a and that MCS 3 may be used for the second beamformed direction 502b, 504b.

The base station 502 may determine a beam configuration 554 based on the first beamformed direction 502a, 504a and the second beamformed direction 502b, 504b. The beam configuration 554 may be used for a data transmission that includes at least one CB (e.g., at least one of the CBs 538a, 538b, 538c, 538d, 538n-1, 538n) in a first RB 580 (e.g., a PRB). In certain configurations, the at least one CB may include a first set of bits 556a and a second set of bits 556b, which may be encoded with a same channel code (e.g., TC, TBCC, LDPC, URLLC, polar codes, etc.). The at least one CB, including the first set of bits 556a and the second set of bits 556b, may include a TB (e.g., the TB 534), which may be transmitted in one TTI without spatial multiplexing. The TB may be divided into multiple CBs, and the same channel coding may be applied to each CB. A number of CBs may be grouped into a CBG (e.g., a CBG 540a, 540b, 540m), and a PDSCH and/or PUSCH transmission may be scheduled based on the CBG.

In addition, the beam configuration may include the first beamformed direction 502a, 504a that is used to communicate the first set of bits of the at least one CB and the second beamformed direction 502b, 504b in a second beam direction that is used to communicate the second set of bits of the at least one CB. In some aspects, the base station 502 may determine that the first set of bits 556a and the second set of bits 556b are to be time-division multiplexed in the first RB 580. That is, the base station 502 may determine that the first set of bits 556a are to be transmitted in a first set of symbols 582a in the first RB 580, and the base station 502 may determine that the second set of bits 556b are to be transmitted in a second set of symbols 582b in the first RB 580. The first set of symbols 582a and the second set of symbols 582b may be contiguous or non-contiguous (e.g., interleaved).

The base station 502 may transmit signaling that indicates the beam configuration 554 for the data transmission to the UE 504. In certain aspects, the signaling may indicate a switch in the first RB 580 between the first set of symbols 582a in which the first set of bits 556a of the at least one CB is communicated using the first beamformed direction 502a, 504a and the second set of symbols 582b in which the second set of bits 556b of the at least one CB is communicated using the second beamformed direction 502b, 504b. In various aspects, the base station 502 may signal the beam configuration 554 in one or more of DCI signaling, MAC-CE signaling, and/or RRC signaling. For example, the base station 502 may use RRC signaling to indicate a beam table for a plurality of beam switch patterns, and the base station 502 may use DCI signaling or MAC-CE signaling to indicate a selection of one of the plurality of beam switch patterns (e.g., a selection of a pattern in which the first beamformed direction 502a, 504a is used in the first set of symbols 582a and the second beamformed direction 502b, 504b is used in the second set of symbols 582b). Further, the base station 502 may include, in the signaling of the beam configuration 554, an indication of the first MCS (e.g., MCS 1) for the first beamformed direction 502a, 504a and the second MCS (e.g., MCS 3) for the second beamformed direction 502b, 504b. In certain aspects, the base station 502 may determine a TB size of associated with the transmission of the first set of bits 556a and the second set of bits 556b based at least in part on the first MCS and the second MCS.

Based on the beam configuration 554, the base station 502 may transmit a data transmission in the first RB 580 including the first set of bits 556a and the second set of bits 556b. Specifically, the base station 502 may transmit the first set of bits 556a of the at least one CB in the first set of symbols 582a of the first RB 580 using the first beamformed direction 502a, 504a, and the base station 502 may transmit the second set of bits 556b of the at least one CB in the second set of symbols 582b of the first RB 580 using the second beamformed direction 502b, 504b. The base station 502 may switch from using the first beamformed direction 502a, 504a to using the second beamformed direction 502b, 504b according to a time indicated in the beam configuration 554. In some aspects, the data transmission may include at least one first reference signal (e.g., at least one DMRS, at least one PTRS) communicated via the first beamformed direction 502a, 504a in the first set of symbols 582a, and the data transmission may further include at least one second reference signal (e.g., at least one DMRS, at least one PTRS) communicated via the second beamformed direction 502b, 504b in the second set of symbols 582b.

The UE 504 may receive the first set of bits 556a of the at least one CB in the first set of symbols 582a of the first RB 580 using the first beamformed direction 502a, 504a. Further, the UE 504 may receive the second set of bits 556b of the at least one CB in the second set of symbols 582b of the first RB using the second beamformed direction 502b, 504b. The UE 504 may switch between the first beamformed direction 502a, 504a and the second beamformed direction 502b, 504b in order to receive the first and second sets of bits 556a, 556b of the at least one CB in the first and second sets of symbols 582a, 582b based on information indicating a switch between the first set of symbols 582a and the second set of symbols 582b included in the beam configuration 554. Accordingly, the UE 504 may receive the at least one CB, including the first and second sets of bits 556a, 556b, in the first RB 580 by switching between using the first beamformed direction 502a, 504a for the first set of symbols 582a and using the second beamformed direction 502b, 504b for the second set of symbols 582b.

While FIG. 5D illustrates data transmission by the base station 502 to the UE 504, a similar procedure may be implemented for data transmission by the UE 504 to the base station 502. For example, the UE 504 may transmit the first set of bits 556a of the at least one CB in the first set of symbols 582a of the first RB 580 using the first beamformed direction 502a, 504a. Further, the UE 504 may transmit the second set of bits 556b of the at least one CB in the second set of symbols 582b of the first RB using the second beamformed direction 502b, 504b. The UE 504 may switch between the first beamformed direction 502a, 504a and the second beamformed direction 502b, 504b in order to transmit the first and second sets of bits 556a, 556b of the at least one CB in the first and second sets of symbols 582a, 582b based on information indicating a switch between the first set of symbols 582a and the second set of symbols 582b included in the beam configuration 554. Accordingly, the UE 504 may transmit the at least one CB, including the first and second sets of bits 556a, 556b, in the first RB 580 by switching between using the first beamformed direction 502a, 504a for the first set of symbols 582a and using the second beamformed direction 502b, 504b for the second set of symbols 582b.

Figure 6A:
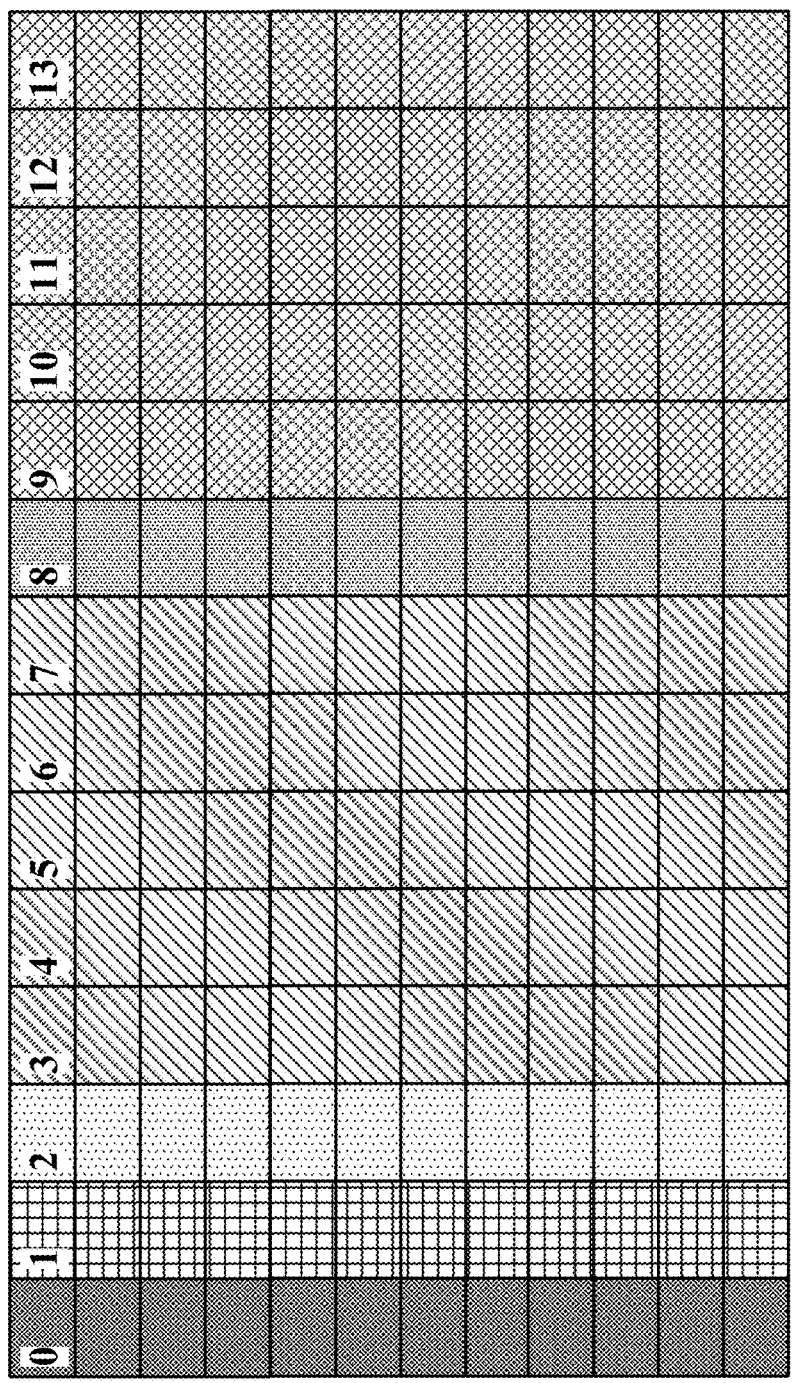
FIG. 6A illustrates a resource mapping in accordance with certain aspects of the present disclosure.
Figure 6A:

FIG. 6A illustrates a resource mapping 600 for a block (e.g., a PRB, the first RB 580) in accordance with certain aspects of the present disclosure. In the example illustrated in FIG. 6A, the bits of the block are mapped to symbols 0-13 in the time domain and twelve tones in the frequency domain. In certain configurations, the bits of the block may be mapped to different symbols before being mapped to the tones. The resource mapping 600 may be used, e.g., by the base station 502 and the UE 504 of FIGS. 5C and 5D for communications by switching between the first beamformed direction 502a, 504a and the second beamformed direction 502b, 504b. The resource mapping 600 illustrated in FIG. 6A is for downlink communications. However, the resource mapping 600 may be for uplink communications or for both uplink/downlink communications without departing from the scope of the present disclosure.

Symbol 0 may be used for transmitting control data via a PDCCH 602 for a first beamformed direction 502a, 504a, and symbol 1 may be used for communicating control data via a second PDCCH 604 for the second beamformed direction 502b, 504b. For example, symbol 0 may be included in the first set of symbols 582a, and symbol 1 may be included in the second set of symbols 582b. The DMRS 606 for the first beamformed direction 502a, 504a may be mapped to symbol 2. The PDSCH bits 608 of the block may be mapped to symbols 3-7, and transmitted by the base station 502 via a PDSCH associated with the first beamformed direction 502a, 504a. Referring to FIG. 5D, the first set of symbols 582a may include the symbol 2 in which the DMRS 606 is transmitted using the first beamformed direction 502a, 504a. Additionally, the first set of symbols 582a may include the PDSCH bits 608 in which the PDSCH is transmitted using the first beamformed direction 502a, 504a.

The DMRS 610 for the second beamformed direction 502b, 504b may be mapped to symbol 8. The PDSCH bits 612 of the block may be mapped to symbols 9-13, and transmitted by the base station 502 via the PDSCH associated with the second beamformed direction 502b, 504b. Referring to FIG. 5D, the second set of symbols 582b may include the symbol 8 in which the DMRS 610 is transmitted using the second beamformed direction 502b, 504b. Additionally, the second set of symbols 582b may include the PDSCH bits 612 in which the PDSCH is transmitted using the second beamformed direction 502b, 504b.

The UE 504 may switch between the first beamformed direction 502a, 504a and the second beamformed direction 502b, 504b in order to receive the different sets of coded bits of the block in the first set of symbols 582a and the second set of symbols 582b in the first RB 580.

Figure 6B:
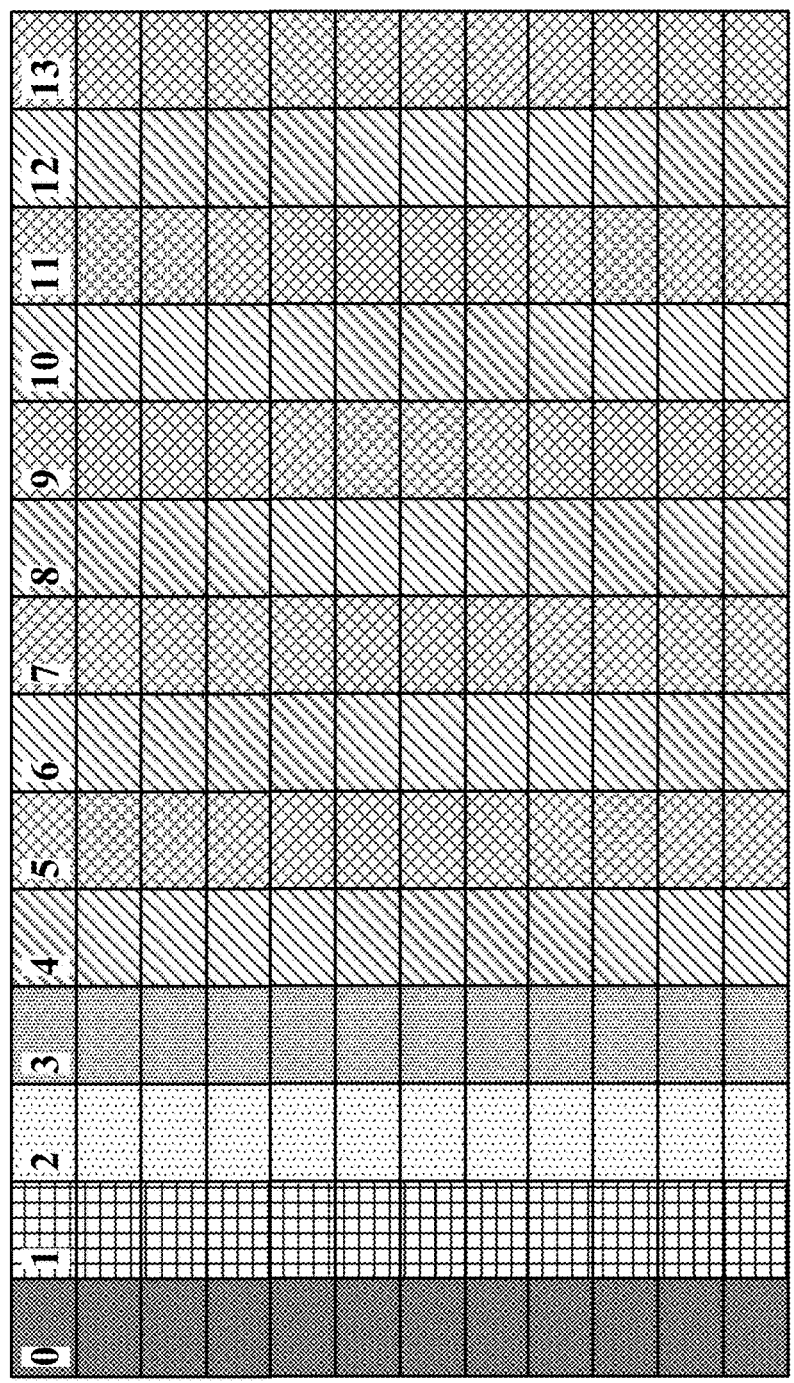
FIG. 6B illustrates a resource mapping in accordance with certain aspects of the present disclosure.

FIG. 6B illustrates a resource mapping 615 in accordance with certain aspects of the present disclosure. In the example illustrated in FIG. 6B, the bits of the block are mapped to symbols 0-13 in the time domain and twelve tones in the frequency domain. In certain configurations, the bits of the block may be mapped to different symbols before being mapped to the tones. The resource mapping 600 may be used, e.g., by the base station 502 and the UE 504 from FIG. 5C for communications by switching between the first beamformed direction 502a, 504a and the second beamformed direction 502b, 504b. The resource mapping 615 illustrated in FIG. 6B is for downlink communications. However, the resource mapping 615 may be for uplink communications or for both uplink/downlink communications without departing from the scope of the present disclosure.

Symbol 0 may be used for transmitting control data via a PDCCH 602 for a first beamformed direction 502a, 504a, and symbol 1 may be used for communicating control data via a second PDCCH 604 for the second beamformed direction 502b, 504b. The DMRS 606 for the first beamformed direction 502a, 504a may be mapped to symbol 2, and the DMRS 610 for the second beamformed direction 502b, 504b may be mapped to symbol 3. The PDSCH bits 608 of the block may be mapped to symbols 4, 6, 8, 10, and 12, and transmitted by the base station 502 via a PDSCH associated with the first beamformed direction 502a, 504a at the respective time intervals associated with symbols 4, 6, 8, 10, and 12. For example, referring to FIG. 5D, the first set of symbols 582a may include the symbol 2 in which the DMRS 606 is transmitted using the first beamformed direction 502a, 504a. Additionally, the first set of symbols 582a may include the symbols 4, 6, 8, 10, and 12 in which the PDSCH bits 608 are transmitted using the first beamformed direction 502a, 504a.

The PDSCH bits 612 of the block may be mapped to symbols 5, 7, 9, 11, and 13, and transmitted by the base station 502 via the PDSCH associated with the second beamformed direction 502b, 504b at the respective time intervals associated with symbols 5, 7, 9, 11, and 13. The UE 504 may switch between the first beamformed direction 502a, 504a and the second beamformed direction 502b, 504b in order to receive the different sets of coded bits of the block. For example, referring to FIG. 5D, the second set of symbols 582b may include the symbol 3 in which the DMRS 610 is transmitted using the second beamformed direction 502b, 504b. Additionally, the second set of symbols 582b may include the symbols 5, 7, 9, 11, and 13 in which the PDSCH bits 612 are transmitted using the second beamformed direction 502b, 504b.

Figure 7:
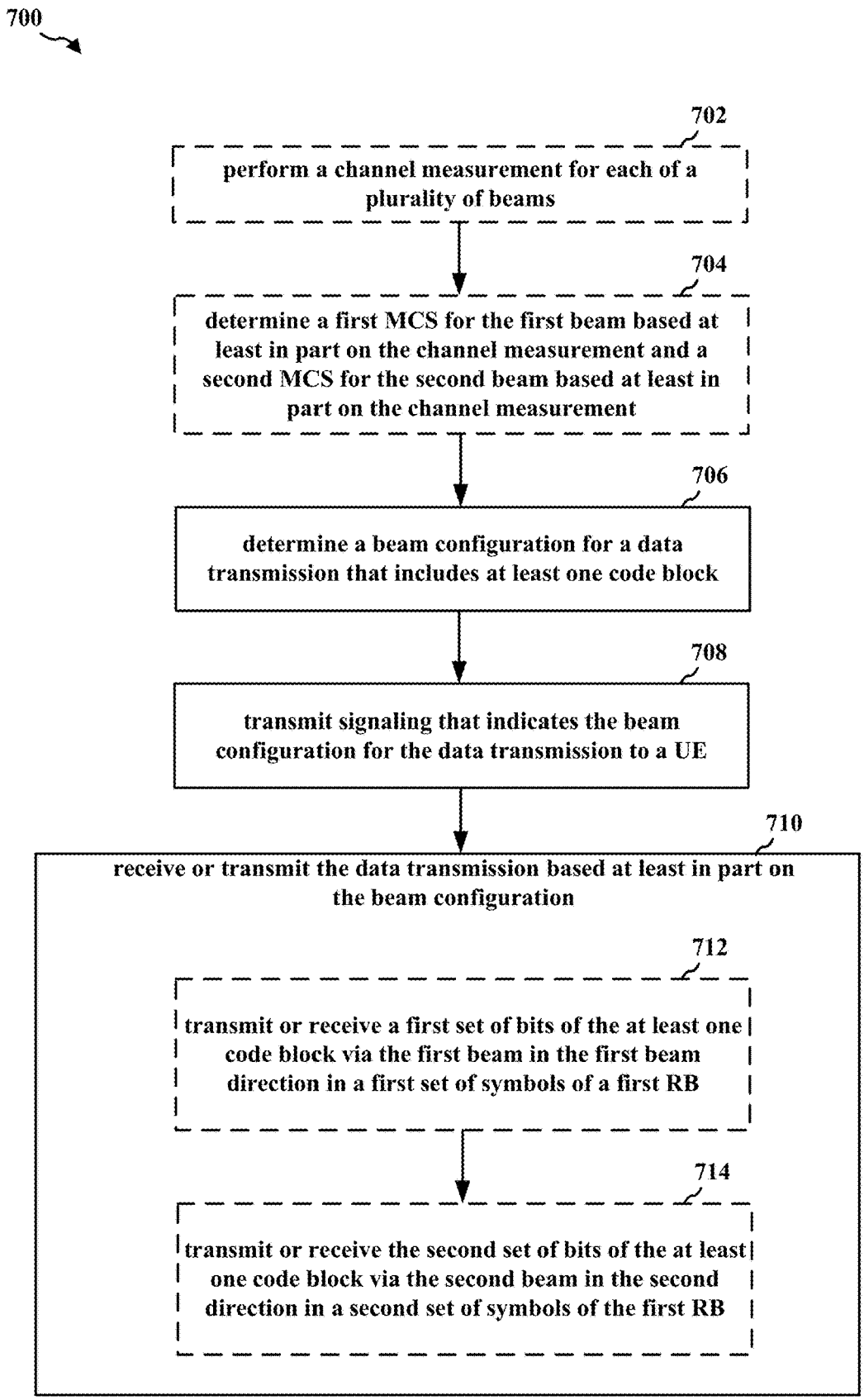
FIG. 7 is a flowchart of a method of wireless communication.

FIG. 7 is a flowchart 700 of a method of wireless communication. The method may be performed by a base station (e.g., base station 102, 180, 310, 402, 502, 1150, the apparatus 802/802'). In FIG. 7, optional operations are indicated with dashed lines.

At 702, the base station may perform a channel measurement for each of a plurality of beams. For example, the base station may transmit or receive a respective reference signal using each of a set of beams, and the base station may determine a measurement associated with channel quality (e.g., SNR, RSRP, etc.) based on each reference signal. Each measurement may correspond with a beam on which a respective reference signal is received, and the base station may determine a set of beams having the "best" or highest measurements. In certain configurations, a beam configuration may be determined based at least in part on the channel measurement for each of the plurality of beams. For example, referring to FIG. 4, the base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same. For example, referring to FIG. 5D, the base station 502 may perform the channel measurements 552 in order to select the first beamformed direction 502a, 504a and the second beamformed direction 502b, 504b.

At 704, the base station may determine a first MCS for the first beam based at least in part on the channel measurement and a second MCS for the second beam based at least in part on the channel measurement. For example, the base station may determine a first MCS corresponding to a first measurement associated with the first beam, and the base station may select the determined first MCS for the first beam. Similarly, the base station may determine a second MCS corresponding to a second measurement associated with the second beam, and the base station may select the determined second MCS for the second beam. In certain aspects, a TB size of the data transmission may be selected based at least in part on the first MCS and the second MCS. For example, referring to FIG. 5D, the base station 502 may determine that MCS 1 may be used for the first beamformed direction 502a, 504a and that MCS 3 may be used for the second beamformed direction 502b, 504b.

At 706, the base station may determine a beam configuration for a data transmission, and the beam configuration may include a first beam associated with a first beam direction and a second beam associated with a second beam direction. The data transmission may include at least one code block in a first RB. In certain configurations, the at least one code block may include a first set of bits and a second set of bits. In certain other aspects, the beam configuration may include a first beam in a first beam direction that is used to communicate the first set of bits of the at least one code block in a first set of symbols of the first RB and a second beam in a second beam direction that is used to communicate the second set of bits of the at least one code block in a second set of symbols of the first RB. In certain other configurations, the first set of bits and the second set of bits of the at least one code block may be encoded with a same channel code. In certain other aspects, the at least one code block may comprise a code block group. For example, referring to FIG. 5D, the base station 502 may determine beam configuration 554 based at least in part on channel measurements 552 performed for a plurality of beamforming directions. The beams selected for the beam configuration may be beams that meet an SNR threshold, signal strength threshold, etc. Each of the bits in the block may be coded using the same channel code (e.g., TC, TBCC, LDPC, URLLC, polar codes, etc.). In certain configurations, the block may include a TB. One TB may be transmitted in one TTI without spatial multiplexing. The TB may be divided into multiple CBs, and the same channel coding may be applied to each CB. A number of CBs may be grouped into a CBG, and a PDSCH and/or PUSCH transmission may be scheduled based on the CBG.

At 708, the base station may transmit signaling that indicates the beam configuration for the data transmission to a UE. In certain aspects, the signaling may indicate a switch in the first RB between the first set of symbols in which the first set of bits of the at least one code block is communicated using the first beam and the second set of symbols in which the second set of bits of the at least one code block is communicated using the second beam. In certain aspects, the signaling may include one or more of DCI signaling, MAC-CE signaling or RRC signaling. In certain other aspects, the RRC signaling may indicate a beam table for a plurality of beam switch patterns. In certain other aspects, the DCI signaling or MAC-CE signaling down selects one of the plurality of beam switch patterns. In certain other aspects, the signaling may include an indication of the first MCS for the first beam and the second MCS for the second beam. In certain aspects, a TB size of the data transmission may be selected based at least in part on the first MCS and the second MCS. For example, referring to FIG. 5D, upon determining the beam configuration 554, the base station 502 may send signaling (e.g., DCI signaling or RRC signaling) to the UE 504 to indicate the beamformed directions and the associated time intervals (e.g., first set of symbols 582a and the second set of symbols 582b of the first RB 580) that will be used for communications between the base station 502 and the UE 504. In certain configurations, the signaling may include first signaling that identifies a table of beam switching patterns, and second signaling that activates one or more patterns from the table for use in communicating with the base station 502.

At 710, the base station may transmit or receive the data transmission based at least in part on the beam configuration. The data transmission may include the at least one code block in the first RB, and the at least one code block may include the first set of bits in the first set of symbols of the RB and the second set of bits of the at least one code block in the second set of symbols of the first RB.

In certain aspects, the data transmission may include at least one first reference signal communicated via the first beam. In certain other aspects, the at least one first reference signal includes one or more of a first set of DMRSs or a first set of PTRSs. In certain other aspects, the data transmission may include at least one second reference signal communicated via the second beam. In certain other aspects, the at least one second reference signal may include one or more of a second set of DMRSs or a second set of PTRSs.

For example, referring to FIG. 5D, the base station 502 may transmit or receive the first set of bits 556a in the first set of symbols 582a of the first RB 580, and the base station may transmit or receive the second set of bits 556b in the second set of symbols 582b of the first RB 580. Referring to FIG. 6A, the DMRS 606 (or PTRS) for the first beamformed direction 502a, 504a may be mapped to symbol 2. The PDSCH bits 608 of the block may be mapped to symbols 3-7, and transmitted by the base station 502 via a PDSCH associated with the first beamformed direction 502a, 504a in the first set of symbols 582a of the first RB 580. The DMRS 610 (or PTRS) for the second beamformed direction 502b, 504b may be mapped to symbol 8. The PDSCH bits 612 of the block may be mapped to symbols 9-13, and transmitted by the base station 502 via the PDSCH associated with the second beamformed direction 502b, 504b in the second set of symbols 582b of the first RB 580. The UE 504 may switch in the first RB 580 between the first set of symbols 582a in which the PDSCH bits 608 are communicated using the first beamformed direction 502a, 504a and the second set of symbols 582b in which the PDSCH bits 612 are communicated using the second beamformed direction 502b, 504b in order to receive the different sets of coded bits of the block.

At 712, the base station transmit or receive the data transmission in the first RB based at least in part on the beam configuration by transmitting or receiving the first set of bits via the first beam in the first beam direction in the first set of symbols of the first RB. For example, referring to FIG. 5D, the base station 502 may transmit or receive the first set of bits 556a in the first RB 580 based at least in part on the beam configuration 554 by transmitting or receiving the first set of bits 556a via the first beamformed direction 502a, 504a in the first set of symbols 582a of the first RB 580. Referring to FIG. 6A, the PDSCH bits 608 of the block may be mapped to symbols 3-7, and transmitted by the base station 502 via a PDSCH associated with the first beamformed direction 502a, 504a.

At 714, the base station transmit or receive the data transmission in the first RB based at least in part on the beam configuration by transmitting or receiving the second set of bits via the second beam in the second beam direction in the second set of symbols of the first RB. For example, referring to FIG. 5D, the base station 502 may transmit or receive the second set of bits 556b in the first RB 580 based at least in part on the beam configuration 554 by transmitting or receiving the second set of bits 556b via the second beamformed direction 502b, 504b in the second set of symbols 582b of the first RB 580. Referring to FIG. 6A, the PDSCH bits 612 of the block may be mapped to symbols 9-13, and transmitted by the base station 502 via the PDSCH associated with the second beamformed direction 502b, 504b.

Figure 8:
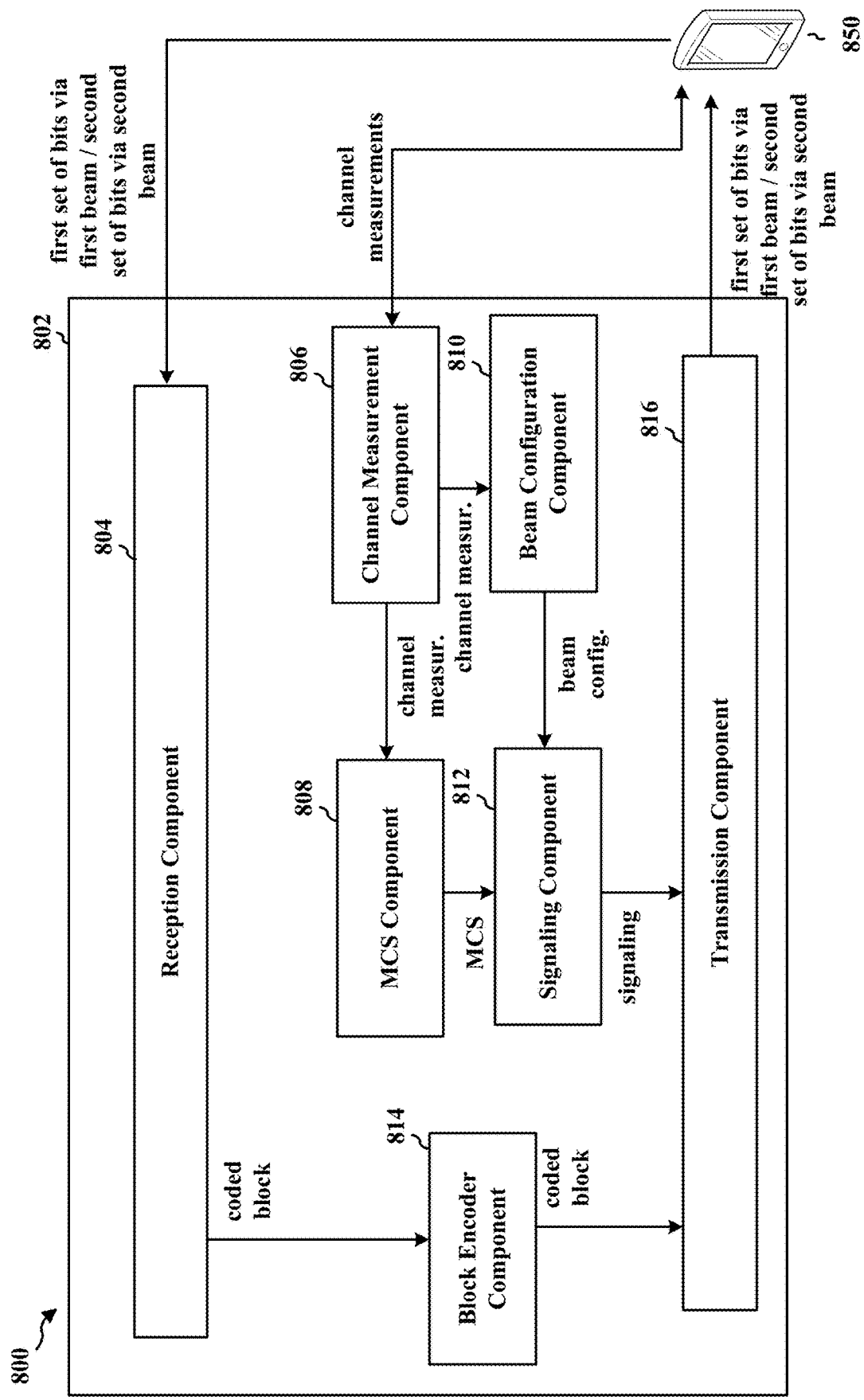
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a base station (e.g., base station 102, 180, 310, 402, 502, 1150, the apparatus 802') in communication with a UE 850 (e.g., UE 104, 350, 404, 504, the apparatus 1102/1102'). The apparatus includes a reception component 804, a channel measurement component 806, an MCS component 808, a beam configuration component 810, a signaling component 812, a block encoder/decoder component 814, and a transmission component 816.

The channel measurement component 806 may be configured to perform a channel measurement for each of a plurality of beams. In certain configurations, a beam configuration may be determined based at least in part on the channel measurement for each of the plurality of beams. The channel measurement component 806 may be configured to send information associated with the channel measurements to one or more of the MCS component 808 and/or the beam configuration component 810.

The MCS component 808 may be configured to determine a first MCS for the first beam based at least in part on the channel measurement and a second MCS for the second beam based at least in part on the channel measurement. In certain aspects, a TB size of the data transmission may be selected based at least in part on the first MCS and the second MCS. The MCS component 808 may be configured to send information associated with the MCS(s) to the signaling component 812.

The beam configuration component 810 may be configured to determine a beam configuration for a data transmission that includes at least one code block in a first RB. In certain configurations, the at least one code block may include a first set of bits and a second set of bits. In certain other aspects, the beam configuration may include a first beam in a first beam direction that is used to communicate the first set of bits of the at least one code block in a first set of symbols of the first RB and a second beam in a second beam direction that is used to communicate the second set of bits of the at least one code block in a second set of symbols of the first RB. In certain other configurations, the first set of bits and the second set of bits of the at least one code block may be encoded with a same channel code. In certain other aspects, the at least one code block may comprise a code block group. The beam configuration may be determined based at least in part on the channel measurement information received from the channel measurement component 806. The beam configuration component 810 may be configured to send information associated with the beam configuration to the signaling component 812.

The signaling component 812 may be configured to generate signaling that indicates the beam configuration for the data transmission to a UE 850. In certain aspects, the signaling may indicate a switch in the first RB between the first set of symbols including the first set of bits of the at least one code block and the second set of symbols including the second set of bits of the at least one code block. In certain aspects, the signaling may include one or more of DCI signaling, MAC-CE signaling or RRC signaling. In certain other aspects, the RRC signaling may indicate a beam table for a plurality of beam switch patterns. In certain other aspects, the DCI signaling or MAC-CE signaling down selects one of the plurality of beam switch patterns.

In certain other aspects, the signaling may include an indication of the first MCS for the first beam and the second MCS for the second beam. In certain aspects, a TB size of the data transmission may be selected based at least in part on the first MCS and the second MCS. The signaling component 812 may be configured to send the signal to the transmission component 816, and the transmission component 816 may be configured to transmit signaling that indicates the beam configuration for the data transmission to the UE 850.

The block encoder/decoder component 814 may be configured to generate a data transmission that includes at least one coded block. The coded block may include a first set of bits and a second set of bits. In certain aspects, the coded block may include on or more of DMRS and/or PTRS for each of the beams. The block encoder/decoder component 814 may be configured to send the coded block to the transmission component 816.

The transmission component 816 and/or reception component 804 may be configured to transmit or receive the data transmission based at least in part on the beam configuration. The data transmission may include the at least one code block in a first RB, and the at least one code block may include the first set of bits in a first set of symbols of the first RB and the second set of bits of the at least one code block in the second set of symbols of the first RB.

In certain aspects, the data transmission may include at least one first reference signal communicated via the first beam. In certain other aspects, the at least one first reference signal includes one or more of a first set of DMRSs or a first set of PTRSs. In certain other aspects, the data transmission may include at least one second reference signal communicated via the second beam. In certain other aspects, the at least one second reference signal may include one or more of a second set of DMRSs or a second set of PTRSs. When the reception component 804 receives the data transmission, the reception component 804 may send the data transmission to the block encoder/decoder component 814 for processing.

The transmission component 816 and/or reception component 804 may be configured to transmit or receive the data transmission based at least in part on the beam configuration by transmitting or receiving the first set of bits via the first beam in the first beam direction in the first set of symbols of the first RB. The transmission component 816 and/or reception component 804 may be configured to transmit or receive the data transmission based at least in part on the beam configuration by transmitting or receiving the second set of bits via the second beam in the second beam direction in the second set of symbols of the first RB.

The apparatus may include additional components that perform each of the blocks of the algorithm in the aforementioned flowchart of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
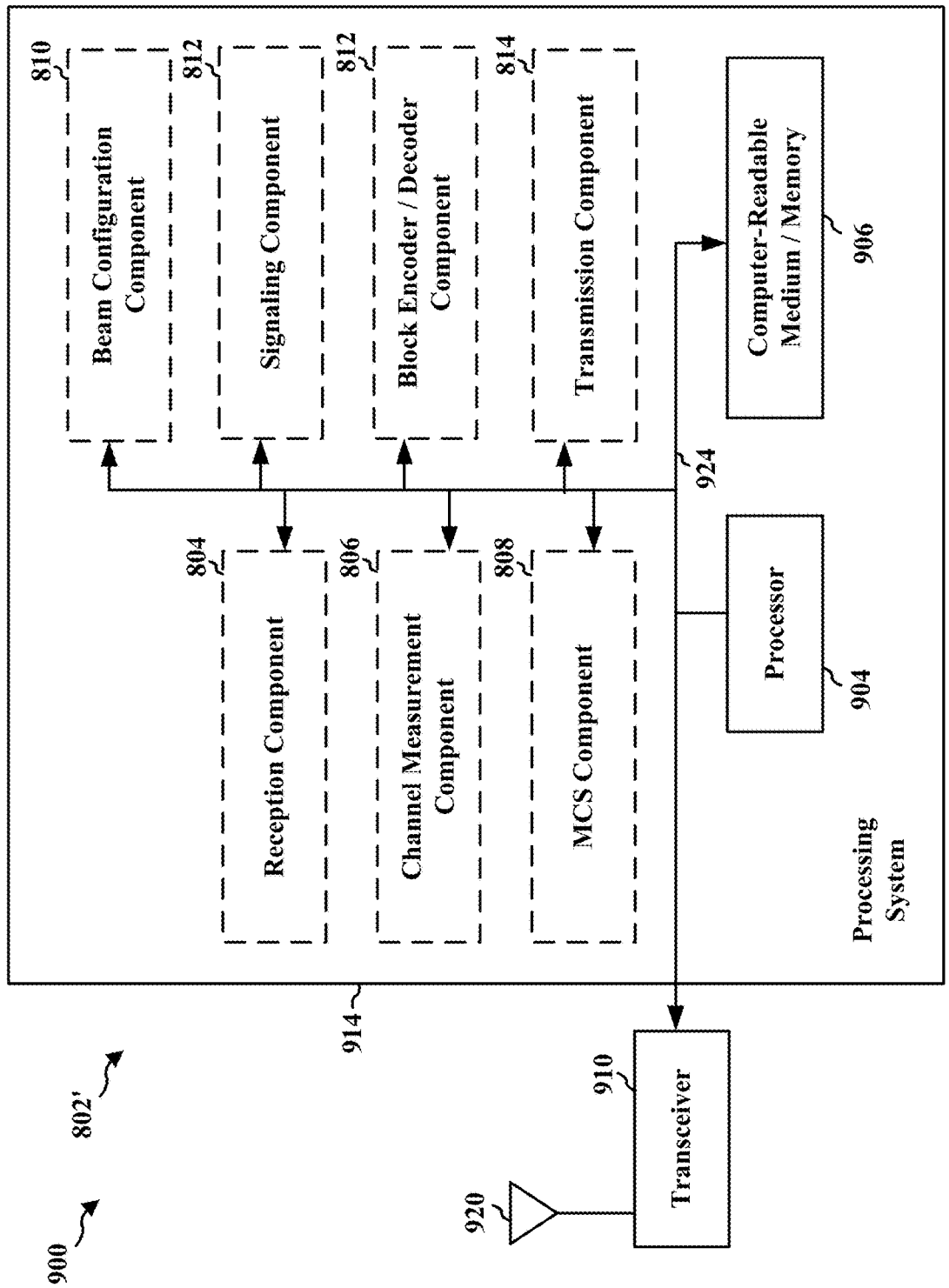
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 816, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816. The components may be software components running in the processor 904, resident/stored in the computer readable medium/memory 906, one or more hardware components coupled to the processor 904, or some combination thereof. The processing system 914 may be a component of the base station 310 and may include the memory 376 and/or at least one of the TX processor 316, the RX processor 370, and the controller/processor 375.

In certain configurations, the apparatus 802/802' for wireless communication may include means for determining a beam configuration for a data transmission, and the beam configuration may include a first beam associated with a first beam direction and a second beam associated with a second beam direction. The apparatus 802/802' may include means for transmitting signaling that indicates the beam configuration for the data transmission to a UE. The apparatus 802/802' may include means for transmitting or receiving the data transmission based at least in part on the beam configuration—the data transmission may include at least one code block in an RB, and the at least one code block may include a first set of bits in a first set of symbols of the RB and a second set of bits of the at least one code block in a second set of symbols of the RB. In an aspect, the signaling indicates a switch in the first RB between the first set of symbols including the first set of bits of the at least one code block and the second set of symbols including the second set of bits of the at least one code block. In an aspect, the signaling includes one or more of DCI signaling, MAC-CE signaling or RRC signaling, and the RRC signaling indicates a beam table for a plurality of beam switch patterns, and the DCI signaling or MAC-CE signaling down selects one of the plurality of beam switch patterns. In an aspect, the means for transmitting or receiving the data transmission is configured to transmit or receive the first set of bits via the first beam in the first beam direction in the first set of symbols of the RB, and transmit or receive the second set of bits via the second beam in the second beam direction in the second set of symbols of the RB. In an aspect, the data transmission includes at least one first reference signal communicated via the first beam in the first set of symbols of the RB, and the data transmission includes at least one second reference signal communicated via the second beam in the second set of symbols of the RB. In an aspect, the at least one first reference signal includes one or more of a first set of DMRSs or a first set of PTRSs, and the at least one second reference signal includes one or more of a second set of DMRSs or a second set of PTRSs. In an aspect, the apparatus 802/802' includes means for determining a first MCS for the first beam based at least in part on a channel measurement and a second MCS for the second beam based at least in part on the channel measurement. In an aspect, the apparatus 802/802' includes means for performing the channel measurement for each of a plurality of beams, the beam configuration being determined based at least in part on the channel measurement for each of the plurality of beams. In an aspect, the signaling includes an indication of the first MCS for the first beam and the second MCS for the second beam. In an aspect, the first set of bits and the second set of bits of the at least one code block are encoded with a same channel code. In an aspect, the at least one code block comprises a code block group.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
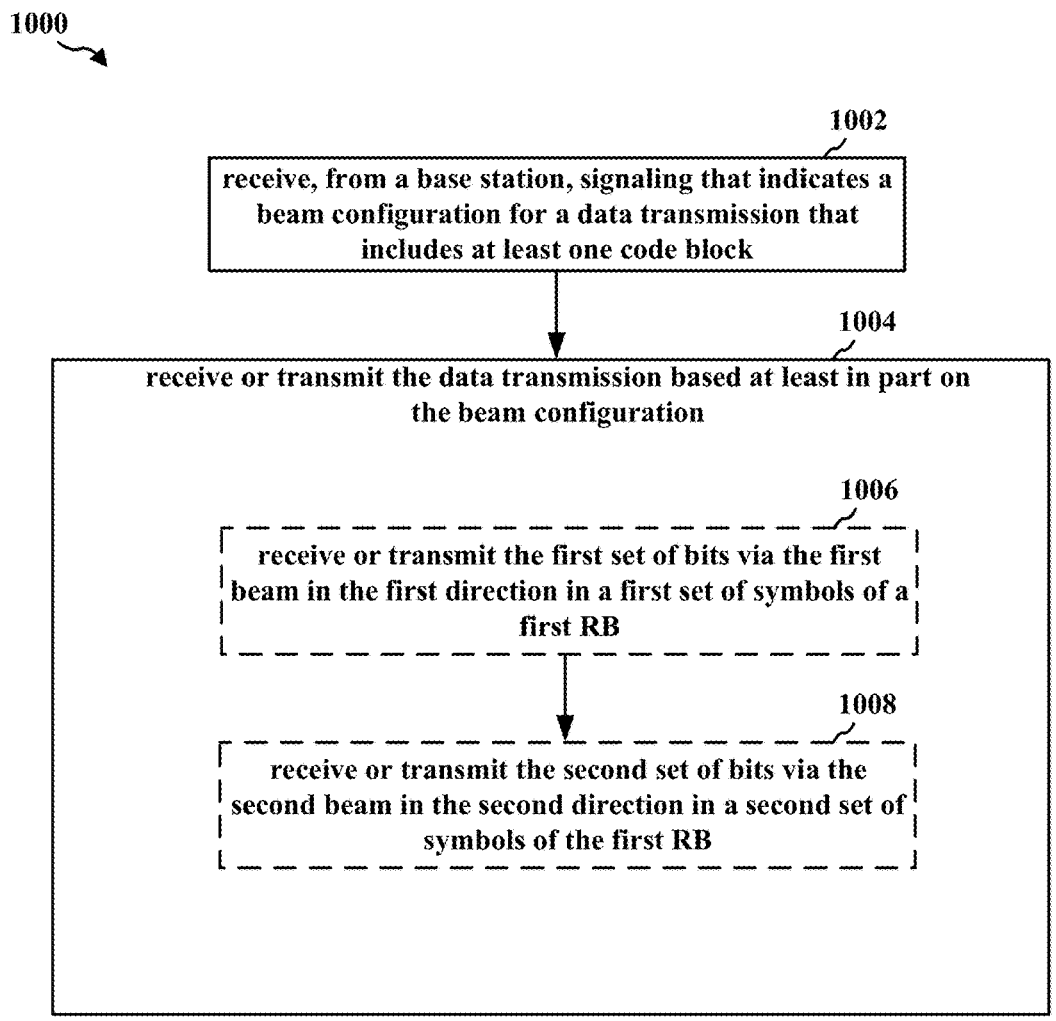
FIG. 10 is a flowchart of a method of wireless communication.

FIG. 10 is a flowchart 1000 of a method of wireless communication. The method may be performed by a UE (e.g., UE 104, 350, 404, 504, 850, the apparatus 1102/1102'). In FIG. 10, optional operations are indicated with dashed lines.

At 1002, the UE may receive, from a base station, signaling that indicates a beam configuration for a data transmission, and the data transmission may include a first beam associated with a first beam direction and a second beam associated with a second beam direction. The data transmission may include at least one code block in a first RB. In certain aspects, the at least one code block including a first set of bits and a second set of bits. In certain other aspects, the beam configuration may include a first beam in a first beam direction that is used to communicate the first set of bits of the at least one code block in a first set of symbols of the first RB and a second beam in a second beam direction that is used to communicate the second set of bits of the at least one code block in a second set of symbols of the first RB. In certain aspects, the signaling may indicate a switch in the first RB between the first set of symbols including the first set of bits of the at least one code block and the second set of symbols including the second set of bits of the at least one code block. In certain aspects, the signaling may include one or more of DCI signaling, MAC-CE signaling or RRC signaling. In certain other aspects, the RRC signaling may indicate a beam table for a plurality of beam switch patterns. In certain other aspects, the DCI signaling or MAC-CE signaling down selects one of the plurality of beam switch patterns.

In certain other aspects, the signaling may include an indication of the first MCS for the first beam and the second MCS for the second beam. In certain aspects, a TB size of the data transmission may be selected based at least in part on the first MCS and the second MCS. For example, referring to FIG. 5D, upon determining the beam configuration 554, the base station 502 may send signaling (e.g., DCI signaling, MAC-CE signaling, or RRC signaling) to the UE 504 to indicate the beam configuration 554 (including the first beamformed direction 502a, 504a and the second beamformed direction 502b, 504b) and the associated time intervals (e.g., a switch in the first RB between a first set of symbols during which the first beamformed direction 502a, 504a is used and a second set of symbols during which the second beamformed direction 502b, 504b is used) that will be used for communications between the base station 502 and the UE 504. In certain configurations, the signaling may include first signaling that identifies a table of beam patterns, and second signaling that activates one or more beams from the table for use in communicating with the base station 502.

At 1004, the UE may receive or transmit the data transmission based at least in part on the beam configuration. The data transmission may include the at least one code block in a first RB, and the at least one code block may include a first set of bits in the first set of symbols of the first RB and the second set of bits of the at least one code block in the second set of symbols of the first RB. In certain aspects, the data transmission may include at least one first reference signal communicated via the first beam. In certain other aspects, the at least one first reference signal includes one or more of a first set of DMRSs or a first set of PTRSs. In certain other aspects, the data transmission may include at least one second reference signal communicated via the second beam. In certain other aspects, the at least one second reference signal may include one or more of a second set of DMRSs or a second set of PTRSs.

For example, referring to FIG. 5D, the UE 504 may transmit or receive the first set of bits 556a in the first set of symbols 582a of the first RB 580, and the UE 504 may transmit or receive the second set of bits 556b in the second set of symbols 582b of the first RB 580. Referring to FIG. 6A, the DMRS 606 (or PTRS) for the first beamformed direction 502a, 504a may be mapped to symbol 2. The PDSCH bits 608 of the block may be mapped to symbols 3-7, and received by the UE 504 via a PDSCH associated with the first beamformed direction 502a, 504a. The DMRS 610 (or PTRS) for the second beamformed direction 502b, 504b may be mapped to symbol 8. The PDSCH bits 612 of the block may be mapped to symbols 9-13, and received by the UE 504 via the PDSCH associated with the second beamformed direction 502b, 504b. The UE 504 may switch between the first beamformed direction 502a, 504a in the first set of symbols 582a of the first RB 580 and the second beamformed direction 502b, 504b in the second set of symbols 582b of the first RB 580 in order to receive the different sets of coded bits of the block.

At 1006, the UE may receive or transmit the data transmission based at least in part on the beam configuration by receiving or transmitting the first set of bits via the first beam in the first beam direction in the first set of symbols of the first RB. For example, referring to FIG. 5D, the UE 504 may transmit or receive the first set of bits 556*a* in the first RB 580 based at least in part on the beam configuration 554 by transmitting or receiving the first set of bits 556*a* via the first beamformed direction 502*a*, 504*a* in the first set of symbols 582*a* of the first RB 580. Referring to FIG. 6A, the PDSCH bits 608 of the block may be mapped to symbols 3-7, and received by the UE 504 via a PDSCH associated with the first beamformed direction 502*a*, 504*a*.

At 1008, the UE may receive or transmit the data transmission based at least in part on the beam configuration by receiving or transmitting the second set of bits via the second beam in the second beam direction in the second set of symbols of the first RB. Referring to FIG. 5D, the UE 504 may transmit or receive the second set of bits 556*b* in the first RB 580 based at least in part on the beam configuration 554 by transmitting or receiving the second set of bits 556*b* via the second beamformed direction 502*b*, 504*b* in the second set of symbols 582*b* of the first RB 580. For example, referring to FIG. 6A, the PDSCH bits 612 of the block may be mapped to symbols 9-13, and received by the UE 504 via the PDSCH associated with the second beamformed direction 502*b*, 504*b*.

Figure 11:
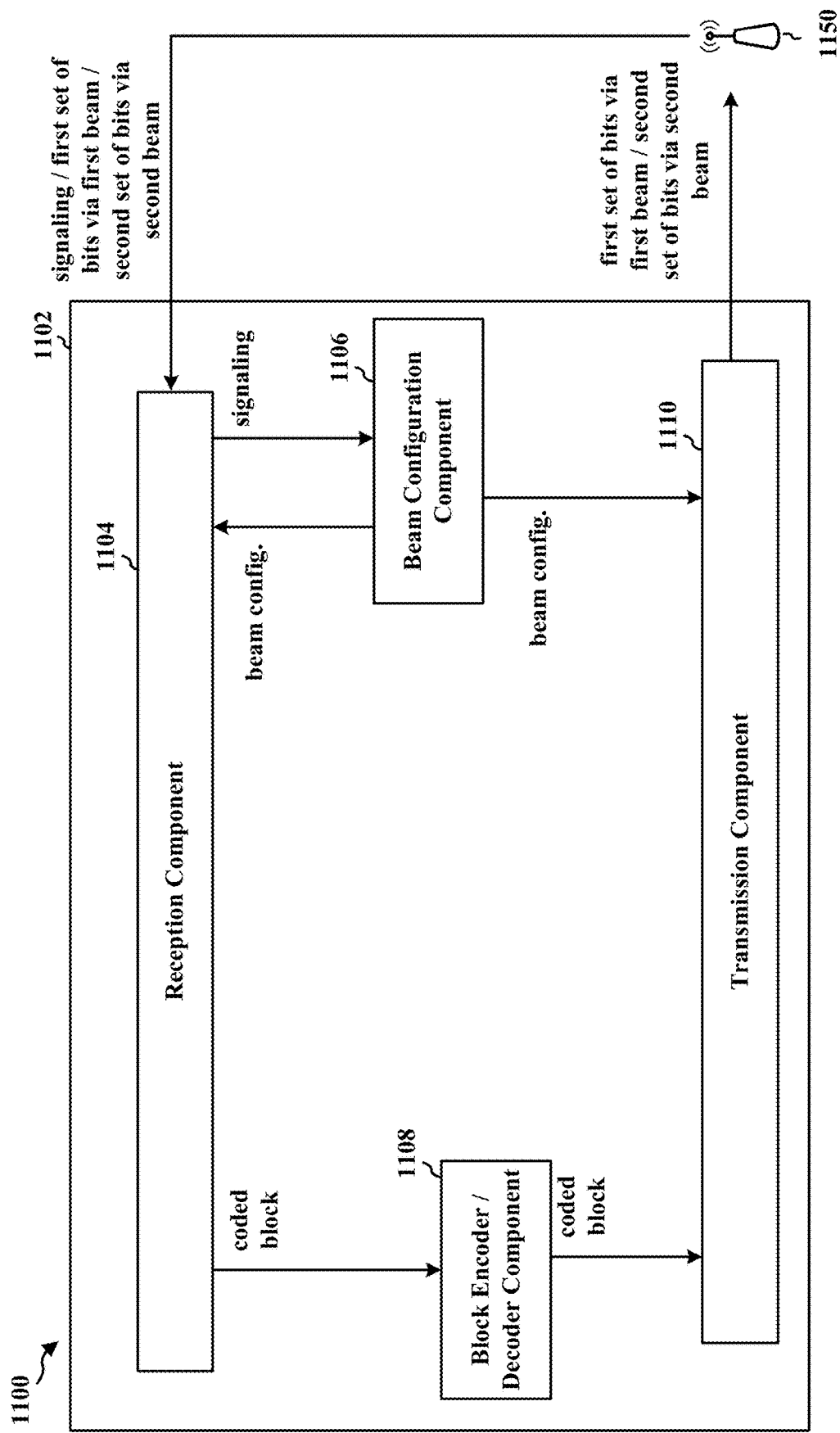
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE (e.g., UE 104, 350, 404, 504, 850, the apparatus 1102/1102') in communication with a base station 1150 (e.g., base station 102, 180, 310, 402, 502, the apparatus 802/802'). The apparatus may include a reception component 1104, a beam configuration component 1106, a block encoder/decoder component 1108, and a transmission component 1110.

The reception component 1104 may be configured to receive, from the base station 1150, signaling that indicates a beam configuration for a data transmission that includes at least one code block in a first RB. In certain aspects, the at least one code block may include a first set of bits and a second set of bits. In certain other aspects, the beam configuration may include a first beam in a first beam direction that is used to communicate the first set of bits of the at least one code block in a first set of symbols of the first RB and a second beam in a second beam direction that is used to communicate the second set of bits of the at least one code block in a second set of symbols of the first RB. In certain aspects, the signaling may indicate a switch in the first RB between the first set of symbols including the first set of bits of the at least one code block and the second set of symbols including the second set of bits of the at least one code block. In certain aspects, the signaling may include one or more of DCI signaling, MAC-CE signaling or RRC signaling. In certain other aspects, the RRC signaling may indicate a beam table for a plurality of beam switch patterns. In certain other aspects, the DCI signaling or MAC-CE signaling down selects one of the plurality of beam switch patterns. In certain other aspects, the signaling may include an indication of the first MCS for the first beam and the second MCS for the second beam. In certain aspects, a TB size of the data transmission may be selected based at least in part on the first MCS and the second MCS. The reception component 1104 may be configured to send the signaling to the beam configuration component 1106 that may maintain information about the beam configuration. The beam configuration component 1106 may be configured to send information associated with the beam configuration to one or more of the reception component 1104 and/or the transmission component 1110.

The block encoder/decoder component 1108 may be configured to generated a coded block that includes a first set of symbols and a second set of symbols. The coded block may be sent to the transmission component 1110.

The reception component 1104 and/or transmission component 1110 may be configured to receive or transmit the data transmission based at least in part on the beam configuration—the data transmission may include the at least one code block in the first RB, and the at least one code block may include the first set of bits in the first set of symbols of the first RB and the second set of bits of the at least one code block in the second set of symbols of the first RB. In certain aspects, the data transmission may include at least one first reference signal communicated via the first beam. In certain other aspects, the at least one first reference signal includes one or more of a first set of DMRSs or a first set of PTRSs. In certain other aspects, the data transmission may include at least one second reference signal communicated via the second beam. In certain other aspects, the at least one second reference signal may include one or more of a second set of DMRSs or a second set of PTRSs.

The reception component 1104 and/or transmission component 1110 may be configured to receive or transmit the data transmission in the first RB based at least in part on the beam configuration by receiving or transmitting the first set of bits via the first beam in the first beam direction in the first set of symbols of the first RB. The reception component 1104 and/or transmission component 1110 may be configured to receive or transmit the data transmission based at least in part on the beam configuration by receiving or transmitting the second set of bits via the second beam in the second beam direction in the second set of symbols of the first RB. The reception component 1104 may be configured to send the data transmission to the block encoder/decoder component 1108 for processing.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
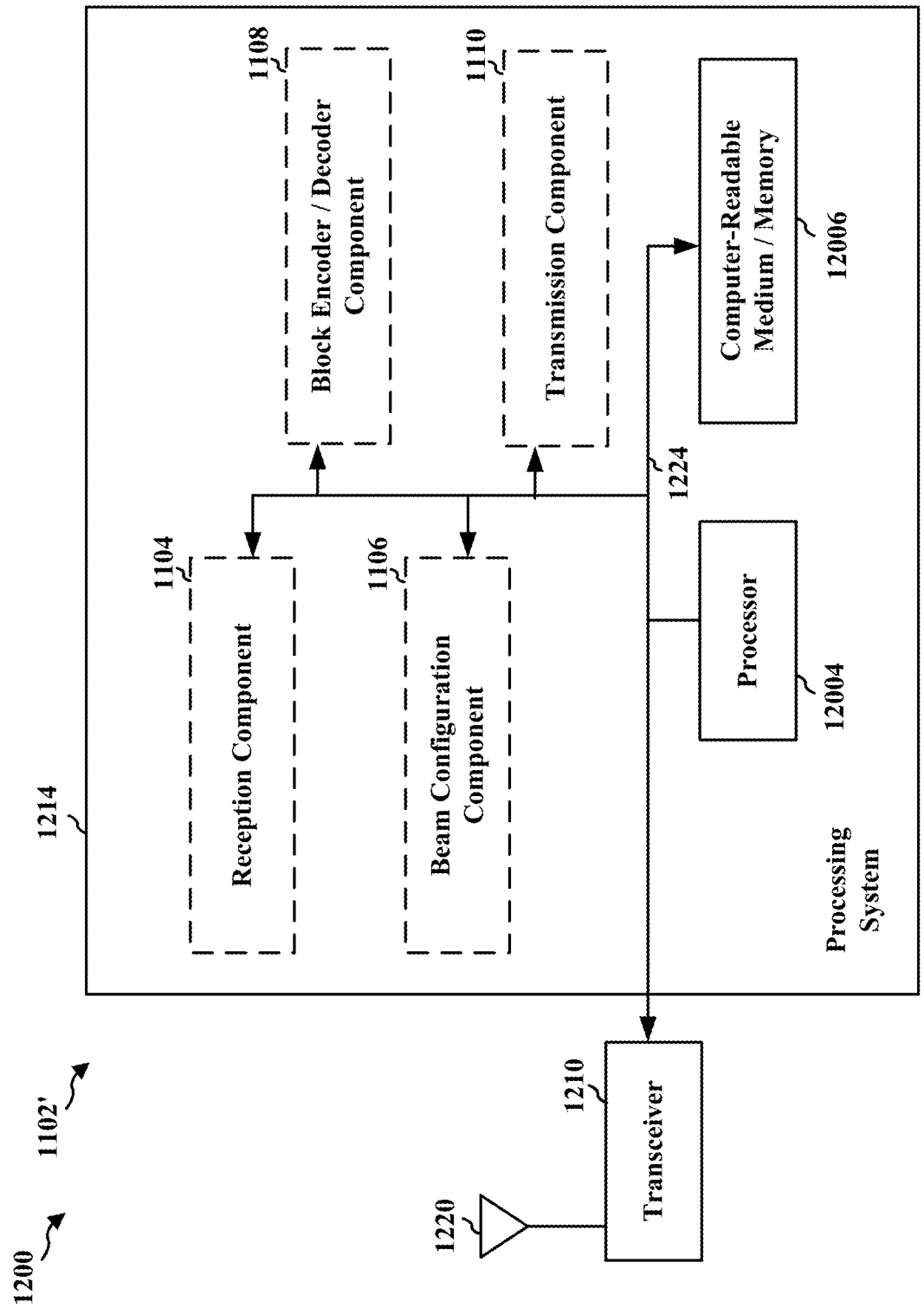
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In certain configurations, the apparatus 1102/1102' for wireless communication may include means for receiving, from a base station, signaling that indicates a beam configuration for a data transmission, and the beam configuration may include a first beam associated with a first beam direction and a second beam associated with a second beam direction. The apparatus 1102/1102' may include means for receiving or transmitting the data transmission based at least in part on the beam configuration—the data transmission may include at least one code block in an RB, and the at least one code block may include a first set of bits in a first set of symbols of the RB and a second set of bits of the at least one code block in a second set of symbols of the RB. In an aspect, the signaling indicates a switch in the first RB between the first set of symbols including the first set of bits of the at least one code block and the second set of symbols including the second set of bits of the at least one code block. In an aspect, the signaling includes one or more of DCI signaling, MAC-CE signaling or RRC signaling, and the RRC signaling indicates a beam table for a plurality of beam switch patterns, and the DCI signaling or MAC-CE signaling down selects one of the plurality of beam switch patterns. In an aspect, the means for receiving or transmitting the data transmission is configured to transmit or receive the first set of bits via the first beam in the first beam direction in the first set of symbols of the RB; and transmit or receive the second set of bits via the second beam in the second beam direction in the second set of symbols of the RB. In an aspect, the data transmission includes at least one first reference signal communicated via the first beam in the first set of symbols of the RB, and the data transmission includes at least one second reference signal communicated via the second beam in the second set of symbols of the RB. In an aspect, the at least one first reference signal includes one or more of a first set of DMRSs or a first set of PTRSs, and the at least one second reference signal includes one or more of a second set of DMRSs or a second set of PTRSs. In an aspect, the signaling includes an indication of a first MCS for the first beam and a second MCS for the second beam. In an aspect, the first set of bits and the second set of bits of the at least one code block are encoded with a same channel code. In an aspect, the at least one code block comprises a code block group.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
 determining a beam configuration for a data transmission, the beam configuration including a first beam associated with a first beam direction and a second beam associated with a second beam direction;

transmitting signaling that indicates the beam configuration for the data transmission to a user equipment (UE); and transmitting or receiving a first set of bits of the data transmission via the first beam and a second set of bits of the data transmission via the second beam based on the beam configuration, the data transmission including at least one code block in a resource block (RB), wherein the at least one code block includes the first set of bits in a first set of symbols of the RB and the second set of bits in a second set of symbols of the RB, the second set of bits comprising redundancy information associated with the first set of bits, and the first set of symbols being different from the second set of symbols.

2. The method of claim 1, wherein the signaling indicates a switch in the RB between the first set of symbols including the first set of bits of the at least one code block and the second set of symbols including the second set of bits of the at least one code block.

3. The method of claim 1, wherein:
the signaling includes one or more of downlink control information (DCI) signaling, medium access control (MAC) control element (CE) (MAC-CE) signaling or radio resource control (RRC) signaling,
the RRC signaling indicates a beam table for a plurality of beam switch patterns, and
the DCI signaling or MAC-CE signaling down selects one of the plurality of beam switch patterns.

4. The method of claim 1, wherein:
the data transmission includes at least one first reference signal communicated via the first beam in the first set of symbols of the RB, and
the data transmission includes at least one second reference signal communicated via the second beam in the second set of symbols of the RB.

5. The method of claim 4, wherein:
the at least one first reference signal includes one or more of a first set of demodulation reference signals (DMRSs) or a first set of phase tracking reference signals (PTRSs), and
the at least one second reference signal includes one or more of a second set of DMRSs or a second set of PTRSs.

6. The method of claim 1, further comprising:
determining a first modulation and coding scheme (MCS) for the first beam based at least in part on a channel measurement and a second MCS for the second beam based at least in part on the channel measurement.

7. The method of claim 6, further comprising:
performing the channel measurement for each of a plurality of beams, the beam configuration being determined based at least in part on the channel measurement for each of the plurality of beams.

8. The method of claim 7, wherein the signaling includes an indication of the first MCS for the first beam and the second MCS for the second beam.

9. The method of claim 1, wherein the first set of bits and the second set of bits of the at least one code block are encoded with a same channel code.

10. The method of claim 1, wherein the at least one code block comprises a code block group.

11. The method of claim 1, wherein the first set of symbols is time-division multiplexed with the second set of symbols.

12. A method of wireless communication of a user equipment (UE), comprising:

receiving, from a base station, signaling that indicates a beam configuration for a data transmission, the beam configuration including a first beam associated with a first beam direction and a second beam associated with a second beam direction; and receiving or transmitting a first set of bits of the data transmission via the first beam and a second set of bits of the data transmission via the second beam based on the beam configuration, the data transmission including at least one code block in a resource block (RB), wherein the at least one code block includes the first set of bits in a first set of symbols of the RB and the second set of bits in a second set of symbols of the RB, the second set of bits comprising redundancy information associated with the first set of bits, and the first set of symbols being different from the second set of symbols.

13. The method of claim 12, wherein the signaling indicates a switch in the RB between the first set of symbols including the first set of bits of the at least one code block and the second set of symbols including the second set of bits of the at least one code block.

14. The method of claim 12, wherein:
the signaling includes one or more of downlink control information (DCI) signaling, medium access control (MAC) control element (CE) (MAC-CE) signaling or radio resource control (RRC) signaling,
the RRC signaling indicates a beam table for a plurality of beam switch patterns, and
the DCI signaling or MAC-CE signaling down selects one of the plurality of beam switch patterns.

15. The method of claim 12, wherein:
the data transmission includes at least one first reference signal communicated via the first beam in the first set of symbols of the RB, and
the data transmission includes at least one second reference signal communicated via the second beam in the second set of symbols of the RB.

16. The method of claim 15, wherein:
the at least one first reference signal includes one or more of a first set of demodulation reference signals (DMRSs) or a first set of phase tracking reference signals (PTRSs), and
the at least one second reference signal includes one or more of a second set of DMRSs or a second set of PTRSs.

17. The method of claim 12, wherein the signaling includes an indication of a first modulation and coding scheme (MCS) for the first beam and a second MCS for the second beam.

18. The method of claim 12, wherein the first set of bits and the second set of bits of the at least one code block are encoded with a same channel code.

19. The method of claim 12, wherein the at least one code block comprises a code block group.

20. An apparatus for wireless communication of a base station, comprising:
at least one processor; and
a memory coupled to the at least one processor and configured to:
determine a beam configuration for a data transmission, the beam configuration including a first beam associated with a first beam direction and a second beam associated with a second beam direction;
transmit signaling that indicates the beam configuration for the data transmission to a user equipment (UE); and transmit or receive a first set of bits the data transmission via the first beam and a second set of bits of the data transmission via the second beam based on the beam configuration, the data transmission including at least one code block in a resource block (RB), wherein the at least one code block includes the first set of bits in a first set of symbols of the RB and the second set of bits in a second set of symbols of the RB, the second set of bits comprising redundancy information associated with the first set of bits, and the first set of symbols being different from the second set of symbols.

21. The apparatus of claim 20, wherein the signaling indicates a switch in the RB between the first set of symbols including the first set of bits of the at least one code block and the second set of symbols including the second set of bits of the at least one code block.

22. The apparatus of claim 20, wherein:
the signaling includes one or more of downlink control information (DCI) signaling, medium access control (MAC) control element (CE) (MAC-CE) signaling or radio resource control (RRC) signaling,
the RRC signaling indicates a beam table for a plurality of beam switch patterns, and
the DCI signaling or MAC-CE signaling down selects one of the plurality of beam switch patterns.

23. The apparatus of claim 20, wherein:
the data transmission includes at least one first reference signal communicated via the first beam in the first set of symbols of the RB, and
the data transmission includes at least one second reference signal communicated via the second beam in the second set of symbols of the RB.

24. An apparatus for wireless communication of a user equipment (UE), comprising:
at least one processor; and
a memory coupled to the at least one processor and configured to:
  receive, from a base station, signaling that indicates a beam configuration for a data transmission, the beam configuration including a first beam associated with a first beam direction and a second beam associated with a second beam direction; and
  receive or transmit a first set of bits of the data transmission via the first beam and a second set of bits of the data transmission via the second beam based on the beam configuration, the data transmission including at least one code block in a resource block (RB), wherein the at least one code block includes the first set of bits in a first set of symbols of the RB and the second set of bits in a second set of symbols of the RB, the second set of bits comprising redundancy information associated with the first set of bits, and the first set of symbols being different from the second set of symbols.

25. The apparatus of claim 24, wherein the signaling indicates a switch in the RB between the first set of symbols including the first set of bits of the at least one code block and the second set of symbols including the second set of bits of the at least one code block.

26. The apparatus of claim 24, wherein:
the signaling includes one or more of downlink control information (DCI) signaling, medium access control (MAC) control element (CE) (MAC-CE) signaling or radio resource control (RRC) signaling,
the RRC signaling indicates a beam table for a plurality of beam switch patterns, and
the DCI signaling or MAC-CE signaling down selects one of the plurality of beam switch patterns.

27. The apparatus of claim 24, wherein:
the data transmission includes at least one first reference signal communicated via the first beam in the first set of symbols of the RB, and
the data transmission includes at least one second reference signal communicated via the second beam in the second set of symbols of the RB.

* * * * *